United States Patent
Ishii

(10) Patent No.: US 8,063,875 B2
(45) Date of Patent: Nov. 22, 2011

(54) ELECTROOPTIC DEVICE, SCANNING-LINE DRIVING CIRCUIT, METHOD FOR DRIVING THE SAME, AND ELECTRONIC DEVICE

(75) Inventor: Kenya Ishii, Fujimi-machi (JP)

(73) Assignee: Seiko Epson Corporation, Tokyo (JP)

( * ) Notice: Subject to any disclaimer, the term of this patent is extended or adjusted under 35 U.S.C. 154(b) by 867 days.

(21) Appl. No.: 11/840,694

(22) Filed: Aug. 17, 2007

(65) Prior Publication Data

US 2008/0079711 A1    Apr. 3, 2008

(30) Foreign Application Priority Data

Sep. 29, 2006   (JP) ................ 2006-268557

(51) Int. Cl.
    *G09G 3/36*   (2006.01)
(52) U.S. Cl. .......................... 345/103; 345/96
(58) Field of Classification Search .............. 345/87, 345/96, 103, 209
    See application file for complete search history.

(56) References Cited

U.S. PATENT DOCUMENTS

| | | | |
|---|---|---|---|
| 6,473,077 B1 * | 10/2002 | Takenaka et al. | ............ 345/209 |
| 6,819,311 B2 * | 11/2004 | Nose et al. | ............ 345/100 |
| 7,362,290 B2 | 4/2008 | Aoki | |
| 7,643,002 B2 * | 1/2010 | Kang et al. | ............ 345/100 |
| 2005/0206597 A1 * | 9/2005 | Ishii | ............... 345/87 |
| 2005/0264549 A1 | 12/2005 | Mizumaki | |
| 2006/0018162 A1 * | 1/2006 | Kawai | ......... 365/185.28 |
| 2006/0152464 A1 * | 7/2006 | Ishii | ................ 345/98 |

FOREIGN PATENT DOCUMENTS

| | | |
|---|---|---|
| JP | A-09-127917 | 5/1997 |
| JP | A 2000-112437 | 4/2000 |
| JP | A-2000-122596 | 4/2000 |
| JP | A 2004-177930 | 6/2004 |
| JP | A-2005-338262 | 12/2005 |
| JP | A-2006-091800 | 4/2006 |

* cited by examiner

*Primary Examiner* — Chanh Nguyen
*Assistant Examiner* — Kwang-Su Yang
(74) *Attorney, Agent, or Firm* — Oliff & Berridge PLC

(57) ABSTRACT

An electrooptic device is driven so that row groups of the pixels that are made black in a first precharge period and a row group of the pixels that are made black in a second precharge period are next to each other.

8 Claims, 20 Drawing Sheets

|      | PERIOD a | PERIOD b | PERIOD c | PERIOD d |
|------|----------|----------|----------|----------|
| Enb1 | Pb1      | Vw2      | Vw1      | Pb2      |
| Enb2 | Pb2      | Pb1      | Vw2      | Vw1      |
| Enb3 | Vw1      | Pb2      | Pb1      | Vw2      |
| Enb4 | Vw2      | Vw1      | Pb2      | Pb1      |

<SECOND PERIOD>

<SEVENTH PERIOD>

ELECTROOPTIC DEVICE, SCANNING-LINE DRIVING CIRCUIT, METHOD FOR DRIVING THE SAME, AND ELECTRONIC DEVICE

BACKGROUND

1. Technical Field

The present invention relates to a technique for improving the moving-image display characteristic of an electrooptic device that employs what is called an area scanning drive system.

2. Related Art

Projectors are becoming widely used which form reduced images using an electrooptic device such as a liquid crystal device and which project the reduced images on enlarged scale with an optical system. Such electrooptic devices that form reduced images have the problem of so-called disclination (inferior orientation) because of the extremely narrow gap between the pixels. The disclination can be prevented by plane inversion (also referred to as frame inversion) in which adjacent pixels are given the same polarity. However, the plane inversion has the problem of causing a difference in display between the upper end and the lower end of the display screen.

To solve the problem of display difference, what is called an area scanning drive system has been proposed in which positive potential and negative potential are applied in the period of one frame, and areas to which the different potentials are written continue in the row direction so that the proportion of the pixels held at positive polarity to the pixels held at negative polarity in one column is one to one at any timing (see JP-A-2004-177930).

In the area scanning drive system, however, the same display content is maintained during one frame because both the positive and negative voltages provide the same display content although polarities are different. This increases the persistence of vision to cause the outline of moving areas to blurs thus posing the problem of low moving-image display characteristic. Such a problem of low moving-image display characteristic is not limited to the area scanning drive system but also occurs in display devices having a hold-type display characteristic such as liquid crystal displays.

SUMMARY

An advantage of some aspects of the invention is to provide an electrooptic device, a scanning-line driving circuit, a method for driving the same, and an electronic device in which the moving-image display characteristic is improved when an area scanning drive system is employed.

According to a first aspect of the invention, there is provided a method for driving an electrooptic device having pixels disposed in correspondence with the intersections of a plurality of rows of scanning lines and a plurality of columns of data lines, each pixel producing a gray level corresponding to a data signal applied to the data lines when a predetermined selecting voltage is applied to a scanning line corresponding to the pixel itself. The method includes specifying four rows apart from each other by a predetermined number of rows out of the plurality of rows of scanning lines in sequence in the vertical scanning direction, and assigning one of a first precharge period, a first writing period, a second precharge period, and a second writing period to the specified four rows; during the first precharge period, applying the selecting voltage to an assigned scanning line, and providing a data signal to the data lines, the data signal having a precharge voltage that makes the pixel black and having one of polarities higher and lower than a predetermined reference voltage; during the first writing period, applying the selecting voltage to an assigned scanning line, and providing a data signal to the data lines, the data signal having a voltage corresponding to the gray level of the pixel and having one of the polarities higher and lower than the reference voltage; during the second precharge period, applying the selecting voltage to an assigned scanning line, and providing a data signal to the data lines, the data signal having a precharge voltage that makes the pixel black and having the other of the polarities higher and lower than the reference voltage; and during the second writing period, applying the selected voltage to an assigned scanning line, and providing a data signal to the data lines, the data signal having a voltage corresponding to the gray level of the pixel and having the other of the polarity higher or lower than the reference voltage. The row of the pixels that are made black in the first precharge period and the row of the pixels that are made black in the second precharge period are next to each other. The method can reduce difference in display between the upper and lower parts of the screen by the area-scan driving system, and the pixels becomes black after producing a gray level to be achieved, thus eliminating afterimages due to gray-level holding. Furthermore, since the black display operation and the precharge for leveling the voltages of the data lines before voltage writing corresponding to the gray level are executed by one operation, the disadvantage of short writing time can be eliminated.

In this case, the first writing period may be started after the end of the first precharge period; and the second writing period may started after the end of the second precharge period. Alternatively the termination of the first precharge period and the beginning of the first writing period may be overlapped, and the termination of the second precharge period and the beginning of the second writing period may be overlapped.

According to a second aspect of the invention, there is provided a scanning-line driving circuit of an electrooptic device, the electrooptic device including: pixels disposed in correspondence with the intersections of a plurality of rows of scanning lines and a plurality of columns of data lines, each pixel producing a gray level corresponding to a data signal applied to the data lines when a predetermined selected voltage is applied to a scanning line corresponding to the pixel itself; and a data line driving circuit that writes a voltage corresponding to the gray level to pixels corresponding to two rows of scanning lines in order of a first precharge period, a first writing period, a second precharge period, and a second writing period, wherein during the first and second precharge periods, the data-line driving circuit applies a data signal that makes the pixels black; and during the first and second writing periods, the data-line driving circuit applies a data signal corresponding to the gray level of the pixels corresponding to the scanning lines to which the selected voltage is applied. The scanning-line driving circuit applies a predetermined selected voltage or nonselected voltage to the plurality of rows of scanning lines. The scanning-line driving circuit includes: a shift register having output stages corresponding to the plurality of rows of scanning lines and outputting active-level signals from output stages corresponding to four rows apart from each other by predetermined rows; and an operating circuit provided to each output stage of the shift register, for carrying out a logic operation on the output signal from the output stage corresponding to the operating circuit itself and one of first to fourth enable signals, and applying the selected voltage or nonselected voltage to the scanning line corresponding to the operating circuit itself on the basis of the logic operation. The operating circuits corresponding to adjacent eight rows of scanning lines input first, second, third, and fourth enable signals every two rows. The first to fourth enable signals go to active level in a predetermined order during the first precharge period, the first writing period, the second precharge period, and the second writing period, during the period in which the signals from the output stages corresponding to the four rows apart from each other by predetermined rows go to active level.

In this case, the first writing period may be started after the end of the first precharge period; and the second writing period may be started after the end of the second precharge period. Alternatively, the first writing period may be started before the end of the first precharge period; and the second writing period may be started before the end of the second precharge period.

The invention may be embodied not only as a method for driving an electrooptic device and a scanning-line driving circuit, but also as an electrooptic device itself, and an electronic device equipped with the electrooptic device.

BRIEF DESCRIPTION OF THE DRAWINGS

The invention will be described with reference to the accompanying drawings, wherein like numbers reference like elements.

FIG. 9 is a diagram illustrating a voltage writing operation during period a.

DESCRIPTION OF EXEMPLARY EMBODIMENTS

Figure 1:
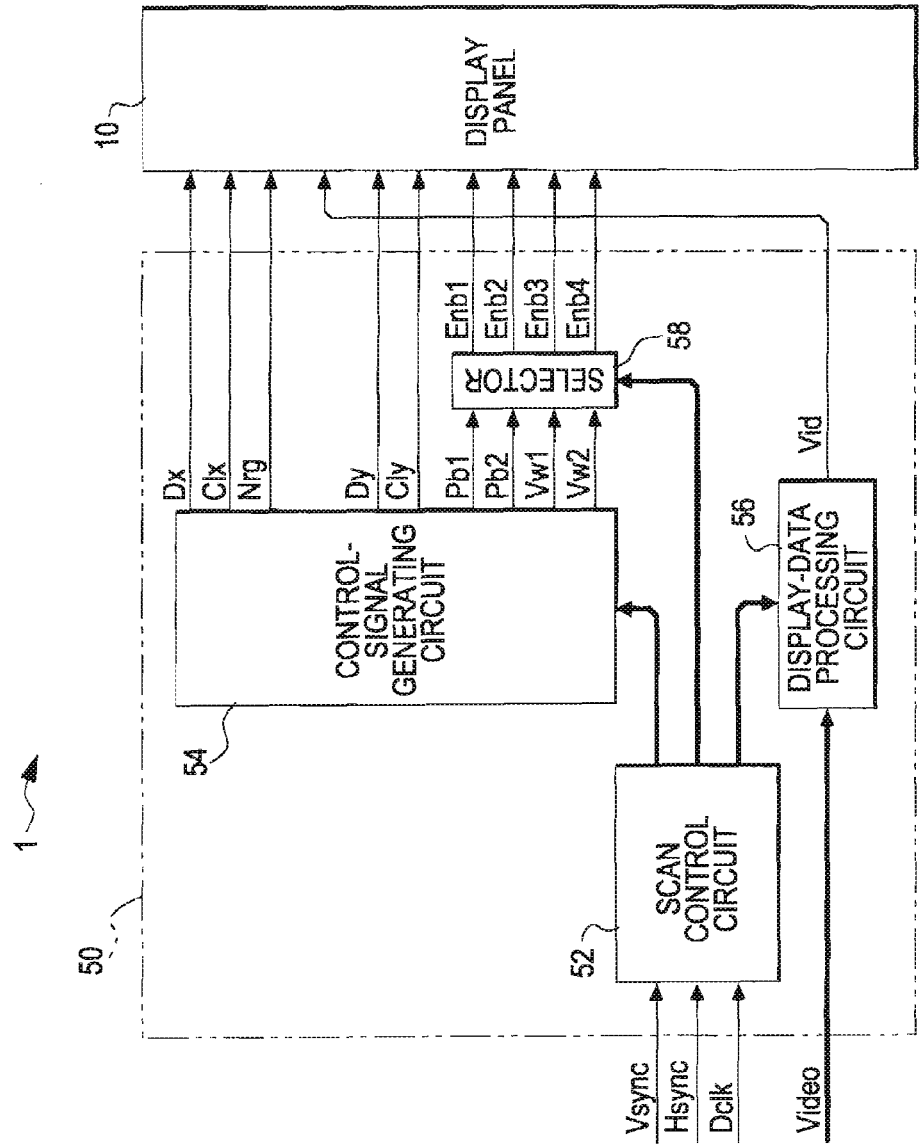
FIG. 1 is a block diagram illustrating the configuration of an electrooptic device according to an, embodiment of the invention.

Embodiments of the invention will be described with reference to the drawings. FIG. 1 is a block diagram illustrating the configuration of an electrooptic device according to an embodiment of the invention.

As shown in the illustration, the electrooptic device 1 is mainly composed of a display panel 10 and a processing circuit 50. The processing circuit 50 is a circuit module for controlling the operation of the display panel 10 in response to the application of a data signal Vid, and is connected to the display panel 10 with, e.g., a flexible printed circuit (FPC) board.

Specifically, the processing circuit 50 includes a scan control circuit 52, a control-signal generating circuit 54, a display-data processing circuit 56, and a selector 58. The scan control circuit 52 controls the control-signal generating circuit 54 and the display-data processing circuit 56 in synchronism with a vertical synchronizing signal Vsync, a horizontal synchronizing signal Hsync, and a dot clock signal Dclk sent from an external higher level device (not shown).

The control-signal generating circuit 54 generates various control signals under the control of the scan control circuit 52. The control signals are described later as appropriate.

The display-data processing circuit 56 temporarily stores display data Video provided from an the external higher level device in an internal memory (not shown under the control of the scan control circuit 52, and reads it in synchronism with the driving of the display panel 10, and converts it to an analog data signal Vid.

The display-data processing circuit 56 further has the function of outputting a voltage precharge signal for displaying pixels in black (at the minimum luminance) as a data signal Vid irrespective of the display data Video during horizontal flyback. The precharge signal may be set at a voltage to provide intermediate luminance, depending on the characteristic of the display panel.

The display data Video designates the gray level of the pixels of the display panel 10. One frame of display data Video is provided at the timing when the vertical synchronizing signal Vsync is applied, and one row of display data Video is provided at the timing when the horizontal synchronizing signal Hsync is applied, although the waveform is not shown. The vertical synchronizing signal Vsync of this embodiment has a frequency of 60 Hz (a cycle of 16.7 ms) The dot; clock signal Dclk specifies the period during which the display data Video of one pixel is provided. The scan control circuit 52 thus controls the circuits in synchronism with the input of display data Video.

The selector (demultiplexer) 58 outputs signals Pb1, Pb2, Vw1, and Vw2 generated from the control-signal generating circuit 54 as enable signals Enb1 to Enb4 under the control of the scan control circuit 52. The details will be described later.

Figure 2:
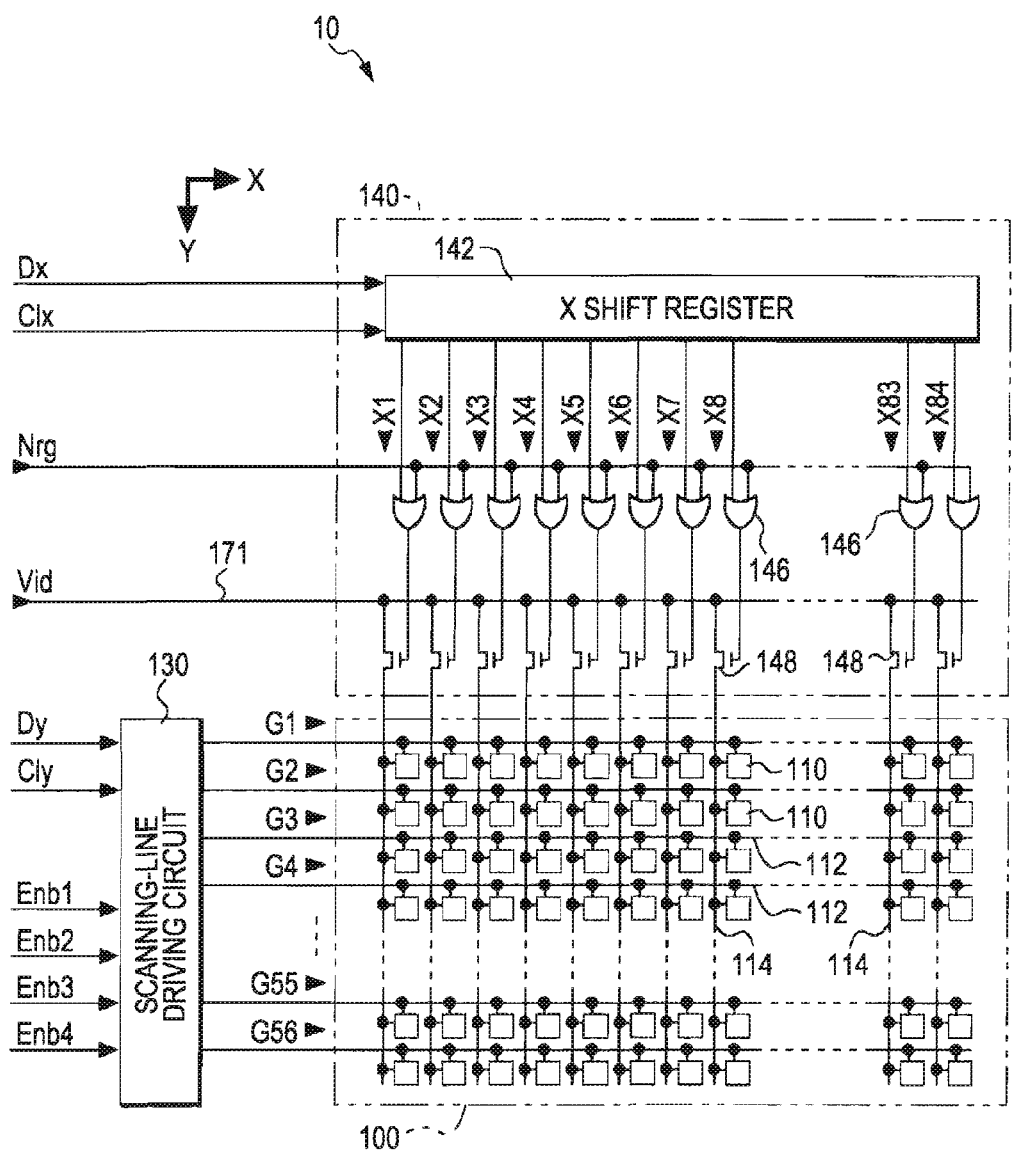
FIG. 2 is a diagram illustrating the configuration of the display panel of the electrooptic device.

The display panel 10 will now be described. FIG. 2 is a diagram illustrating the configuration of the display panel 10.

As illustrated in the drawing, the display panel 10 is of a peripheral circuit built in type in which a scanning-line driving circuit 130 and a data-line driving circuit 140 are housed around a display area 100. The display area 100 has 56 rows of scanning lines 112 extending in the row (X) direction, 84 columns of data lines 114 extending in the column (Y) direction so as to be electrically isolated from the scanning lines 112, and pixels 110 arranged in correspondence with the intersections of the 56 scanning lines 112 and the 84 data lines 114. Thus, the pixels 110 are arranged in 56-by-84 matrix form. However, it is to be understood that this is merely for the sake of simplification of illustration because the driving method according to an embodiment of the invention is complicated, and that the invention is not limited to this arrangement.

Figure 3:
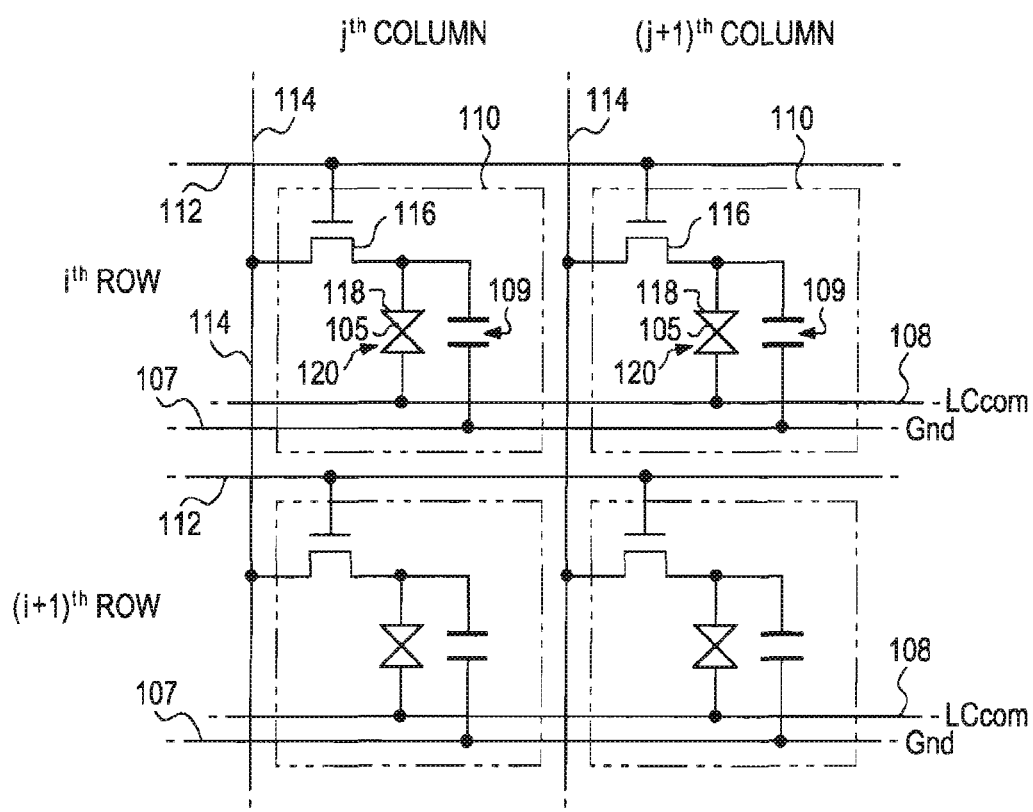
FIG. 3 is a diagram illustrating the configuration of the pixels of the display panel.

Referring to FIG. 3, the configuration of the pixels 110 will be described. FIG. 3 shows the configuration of the four (=2×2) pixels 110 corresponding to the intersections of the $i^{th}$ row and the adjacent lower $(i-+1)^{th}$ row and the $j^{th}$ column and the adjacent $(j+1)^{th}$ column on the right. The symbols i and (i+1) are what the rows of the pixels 110 are generally referred to, which are integers from 1 to 56. The symbols j and (j+1) are what the columns of the pixels 110 are generally referred to, which are integers from 1 to 84.

As shown in FIG. 3, the pixels 110 each have an N-channel thin film transistor (hereinafter, simply referred to as a TFT) 116 and a liquid crystal capacitor 120.

The pixel 110 in the $i^{th}$ row of the $j^{th}$ column will be described as a typical example because the pixels 110 have the same configuration. The gate electrode of the TFT 116 of the pixel 110 in the $i^{th}$ row of the $j^{th}$ column is connected to the scanning line 112 in the $i^{th}$ row, the source electrode is connected to the data line 114 in the $j^{th}$ column, and the drain electrode is connected to a pixel electrode 118 which is one end of the liquid crystal capacitor 120. The other end of the liquid crystal capacitor 120 is a common electrode 108. The common electrode 108 is common to all the pixels 110, to which a temporally constant voltage LCcom is applied.

The display panel 10 has a structure in which a pair of a device substrate and a counter substrate is bonded with a specified gap therebetween, in which liquid crystal is sealed (not shown). The device substrate has the scanning lines 112, the data lines 114, the TFTs 116, and the pixel electrodes 118 together with the scanning-line driving circuit 130 and the data-line driving circuit 140, while the counter substrate has the common electrode 108, which are bonded with a specified gap therebetween such that the electrode formed surfaces are opposed. Thus, the liquid crystal capacitor 120 of the embodiment is configured such that the pixel electrode 118 and the common electrode 108 sandwich the liquid crystal 105.

This embodiment is set in a normally white mode in which if the effective voltage held by the liquid crystal capacitor 120 is close to zero, the transmittance of light passing through the liquid crystal capacitor 120 becomes the maximum to provide white display, and the transmittance decreases as the effective voltage increases, and it finally becomes the minimum to provide black display.

With this structure, by applying a selecting voltage to the scanning line 112 to turn on the TFT 116 (into conduction), and by applying a data signal of a voltage corresponding to the gray level (luminance) to the pixel electrode 118 via the data line 114 and the ON-state TFT 116, the liquid crystal capacitor 120 corresponding to the intersection of the scanning line 112 to which the selecting voltage is applied and the data line 114 to which the data signal is applied can hold an effective voltage corresponding to the gray level.

When an unselected voltage is applied to the scanning line 112, the TFT 116 is turned off (brought out of conduction). At that time, the electrical charge accumulated in the liquid crystal capacitor 120 leaks to no small extent because the off resistance does not become infinite ideally. To reduce the effect of the off-leakage, a storage capacitor 109 is provided for each pixel. One end of each storage capacitor 109 is connected to the pixel electrode 118 (the drain of the TFT 116), and the other ends of the storage capacitors 109 of all the pixels 110 are connected to a capacitor line 107. The capacitor line 107 is held at a temporally constant potential e.g. a ground potential Gnd.

Figure 4:
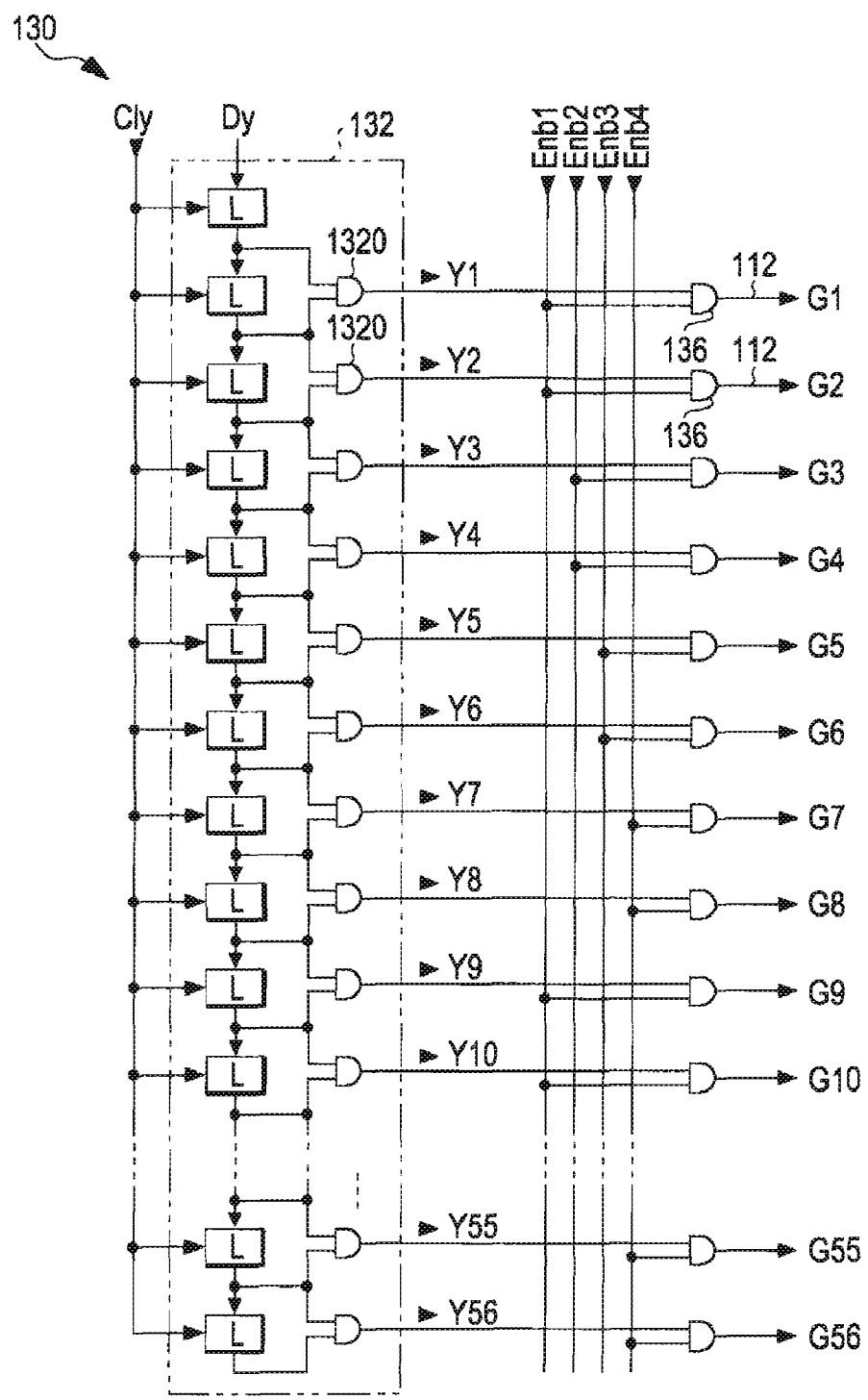
FIG. 4 is a diagram illustrating the configuration of the scanning-line driving circuit of the display panel.

Referring to FIG. 4, the configuration of the scanning-line driving circuit 130 will next be described.

In FIG. 4, a Y-shift register 132 includes 57 stages of transfer circuits (indicated by L) one stage more than the number 56 of the scanning lines 112 in the display area 100 and AND circuits 1320 corresponding to the scanning lines 112.

Each transfer circuit outputs a shift signal from each stage such that it shifts a start pulse Dy of a width corresponding to one cycle of the clock signal Cly in sequence every time the logic level of the clock signal Cly shifts (rises or falls).

The AND circuits 1320 each output an AND signal of the signals output from the transfer circuits of adjacent stages of the 57 stages of transfer circuits. Accordingly, the AND circuit 1320 extracts the overlapped portion of the pulse widths of the signals output from the adjacent transfer circuits and outputs it. The AND signals from the AND circuits 1320 corresponding to the first to $56^{th}$ rows are output from the Y-shift register 132, which are indicated as Y1 to Y56 in the drawing, respectively.

Figure 5:
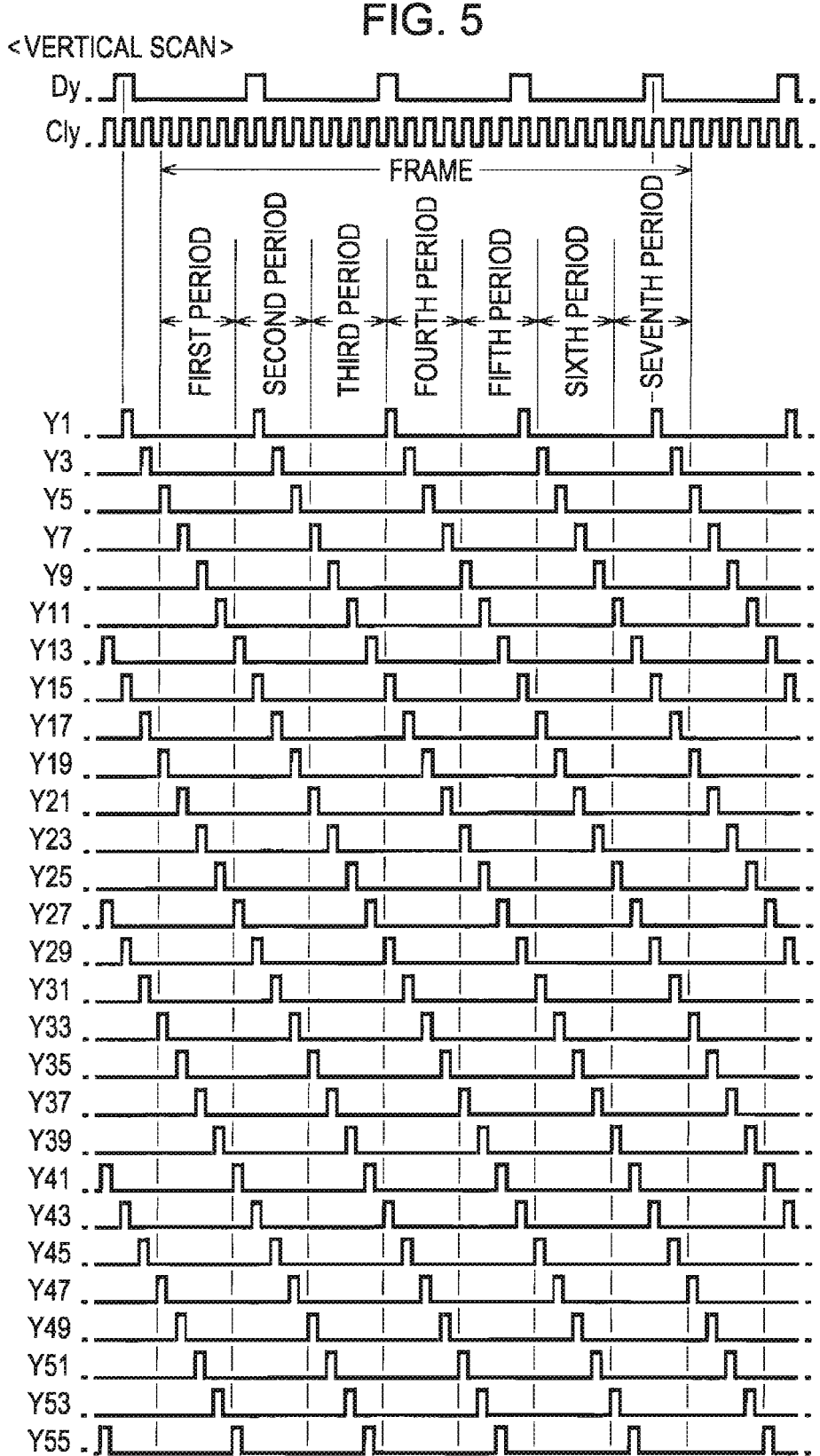
FIG. 5 is a timing chart illustrating the vertical scanning of the electrooptic device.

FIG. 5 is a timing chart illustrating the signals output from the Y-shift register 132 in this embodiment. FIG. 5 only shows output signals corresponding to the odd-numbered (the first, the third, . . . , and the $55^{th}$ rows for the sake of simplification.

The signals output from the transfer circuits are shifted from the start pulse Dy of a width corresponding to one cycle of the clock signal Cly by half the cycle of the clock signal Cly. Thus, the pulse widths of the signals output from the adjacent transfer circuits overlap by half the cycle of the clock signal Cly. The overlapping portions are extracted by the AND circuits 1320.

Therefore, as shown in FIG. 5, if the start pulse Dy rises when the clock signal Cly falls, the signal Y1 is the start pulse Dy extracted during the period from the rising to the falling of the clock signal Cly. Signals Y2 to Y56 are delayed from the signal Y1 by half the cycle of the clock signal Cly.

In this embodiment, the start pulse Dy is applied every seven cycles of the clock signal Cly. Therefore, the 56 stages of signals Y1 to Y56 output from the Y-shift register 132 rise to high level at the same time every 14 rows (obtained by dividing the 56 rows into four). For example, when the signal Y3 rises to high level, the signals Y17, Y31, and Y45 also rise to high level.

In this embodiment, the period required to raise the signals Y1 to Y56 to high level in sequence by the clock signal Cly is 28 cycles of the clock signal Cly, which corresponds to the period of one frame specified by the vertical synchronizing signal Vsync. Its starting point is the timing at which the signal Y5 (Y19, Y33, and Y47) rises to high level, as shown in FIG. 5, for the convenience of illustration. The period of one frame is divided to seven, the first to seventh periods, corresponding to the four cycles of the clock signal Cly.

An AND circuit (Logic circuit) 136 is provided to each row, and outputs an AND signal of the signal (AND signal) output from the AND circuit 1320 and one of enable signals Enb1 to Enb4 as a scanning signal. The relationship among the enable signals Enb1 to Enb4 input to the AND circuits 136 is as follows: specifically, the scanning lines 112 in the first to $56^{th}$ rows are divided every eight rows into seven. The divided eight rows of the scanning lines 112 are provided with enable signals Enb1, Enb1, Enb2, Enb2, Enb3, Enb3, Enb4, and Enb4 in sequence from the top.

Thus, the AND signals by the AND circuits 136 corresponding to the first to 56 rows are output as scanning signals G1 to G56, respectively.

The signals output from the AND circuits 136 are sometimes actually enhanced in driving performance and converted in amplitude through an inverter, a level shifter or the like, which is not described here because it is not particularly important in this invention. The Y-shift register 132 and the AND circuits 1320 and 136 are described as positive logic circuits for simplification of the description of logic operation although they are actually negative logic circuits.

In this scanning-line driving circuit 130, the scanning signals G1 to G56 is active at high level, which is set as selected supply voltage Vdd, and is nonactive at low level, which is set as a nonselecting voltage of a ground potential Gnd.

Referring back to FIG. 2, the data-line driving circuit 140 includes an X-shift register 142, OR circuits 146, and N-channel TFTs 148. The OR circuits 146 and the TFTs 148 are provided to the data lines 114. The X-shift register 142 has a configuration similar to the Y-shift register 132 of the scanning-line driving circuit 130, although not particularly shown. That is, the X-shift register 142 has 85 stages of transfer circuit one stage more than the number 84 of the data lines 114. Each transfer circuit outputs a shift signal that is shifted from a start pulse Dx in sequence every time the logic level of the clock signal Clx shifts (rises or falls). AND circuits each output an AND signal of adjacent shift signals. The AND signals are output as signals X1 to X84.

Therefore, if the start pulse Dx rises when the clock signal Clx falls, the signal X1 is the start pulse Dx extracted during the period from the rising to the falling of the clock signal Clx. Signals X2 to X84 are delayed from the signal X1 by half the cycle of the clock signal Clx.

While the clock signal Clx and the start pulse Dx are not shown, the output states of the signals X2 to X84 are shown in FIGS. 9 to 12.

The OR circuits 146 provided for the columns each output the OR signal of the signal (AND signal) output from the X-shift register 142 with a signal Nrg as a sampling signal. The X-shift register 142 and the OR circuits 146 are actually negative logic circuits.

The source electrode of the TFT 148 is connected to a common image signal line 171 to which a data signal Vid is applied, the drain electrode is connected to the data line 114, and the gate electrode is given a sampling signal. Thus, the TFT 148 whose drain electrode is connected to the data line 114 of the $j^{th}$ column samples the data signal Vid fed to the image signal line 171 to the data line 114 in the $j^{th}$ column when the signal Xj of the X-shift register 142 which is output to the $j^{th}$ column rises to high level or the signal Nrg is at high level.

Figures 6, 7:
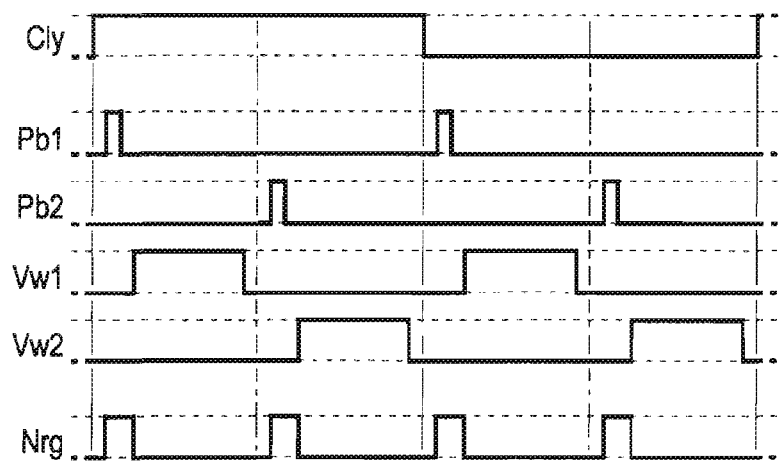
FIG. 6 is a diagram illustrating signals generated by a control-signal generating circuit.
FIG. 7 is a table that shows the assignment of the enable signals.

The signals Pb1, Pb2, Vw1, Vw2, and Nrg generated by the control-signal generating circuit 54 will be described. FIG. 6 shows those signals in relation to the clock signal Cly.

As shown in this drawing, the signal Pb1 is a short pulse that rises to high level at the start of the first half of the equally divided period of the half (the period at high level) of the cycle from the rising to the falling of the clock signal Cly with a duty ratio of 50 percent. The signal Pb2 is a short pulse that rises to high level at the start of the latter half of the equally divided period.

The signal Vw1 is a long pulse that rises to high level after the output of the signal Pb1 during the first half period. The signal Vw2 is a long pulse that rises to high level after the output of the signal Pb2 during the latter half period.

The signal Nrg is a signal output during horizontal flyback, to be described later. Specifically, the signal Nrg rises to high level at the period during which the signals Pb1 and Pb2 are output and before the output of the signals Vw1 and Vw2 at the start of the first half and the start of the latter half of the equally divided period of the clock signal Cly.

The signals Pb1, Pb2, Vw2, and Nrg during the half cycle (during the low-level period) after the falling to the rising of the clock signal Cly have the same waveform during the previous half cycle.

In this embodiment, the signal Pb1 is a signal that specifies the period to apply a selecting voltage to the scanning line 112 so as to write positive voltage corresponding to black to the pixels, and the signal Pb2 is a signal that specifies the period to apply a selecting voltage to the scanning line 112 so as to write negative voltage corresponding to black to the pixels.

The Vw1 is a signal that specifies the period to apply a selecting voltage to the scanning line 112 so as to write positive voltage corresponding to the gray level to the pixels, and the signal Vw2 is a signal that specifies the period to apply a selecting voltage to the scanning line 112 so as to write negative voltage corresponding to the gray level to the pixels.

The signal Nrg is a signal that designates to precharge the data lines 114 in the first to $56^{th}$ columns.

How the signals Pb1, Pb2, Vw1, Vw2, and Nrg are assigned to the enable signals Enb1 to Enb4 by the selector 58 will be described. FIG. 7 is a time table that indicates the assignment of the enable signals Enb1 to Enb4 to the signals Pb1, Pb2, Vw1, Vw2, and Nrg.

As described above, the first to seventh periods of one frame each correspond to the four cycles of the clock signal Cly. The four cycles are each further divided into four such that the period corresponding to one cycle of the clock signal Cly is set at period a, period b, period c, and period d, in sequence.

As shown in FIG. 7, for period a of the first to seventh periods, signals Pb1, Pb2, Vw1, and Vw2 are assigned as enable signals Enb1 to Enb4, respectively; for period b, signals Vw2, Pb1, Pb2, and Vw1 are assigned for period c, signals Vw1, Vw2, Pb1, and Pb2 are assigned; and for period d, signals Pb2, Vw1, Vw2, and Pb1 are assigned.

That is, the assignment of the enable signals Enb1 to Enb4 is shifted by one during periods a to d.

Figure 8:
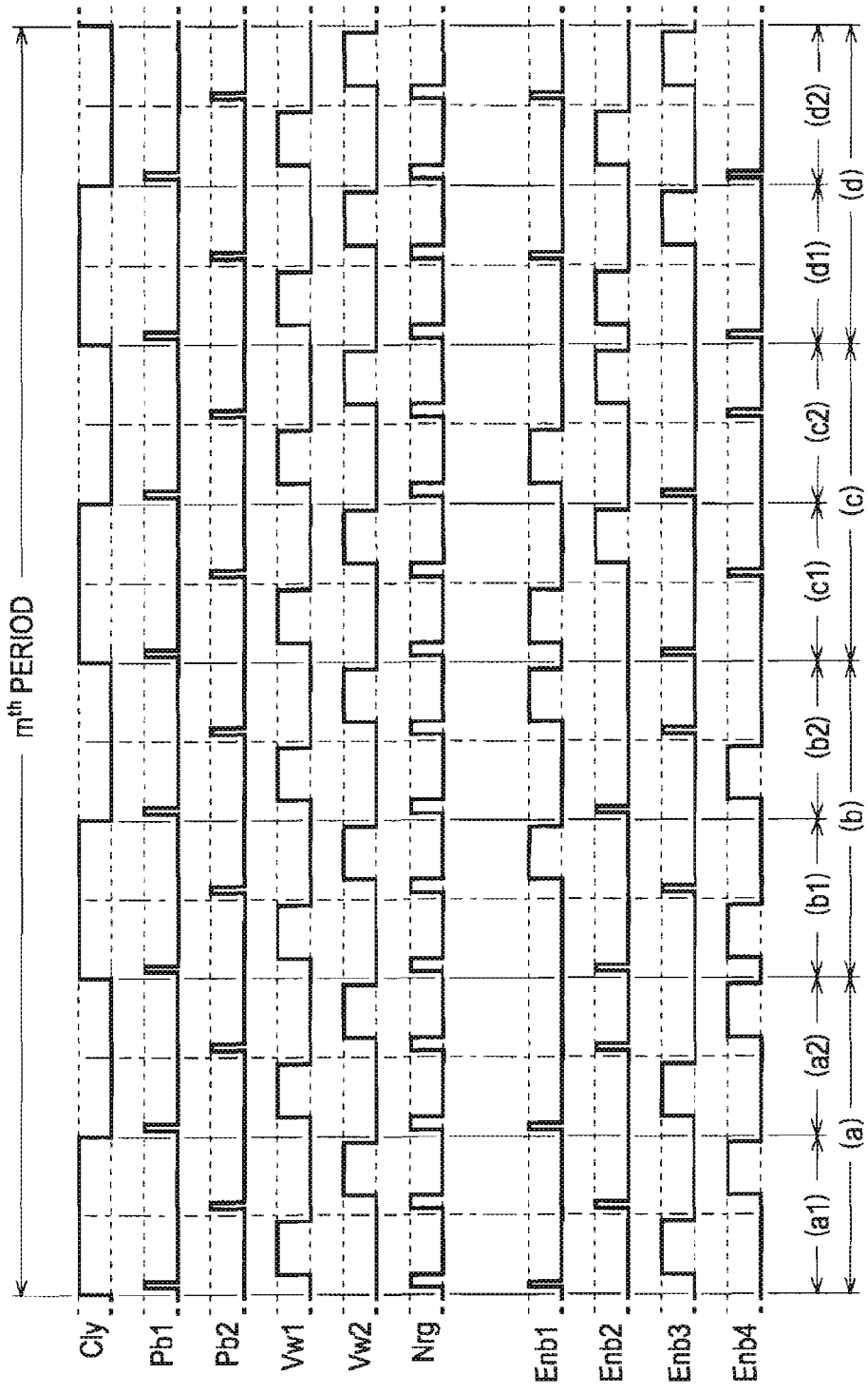
FIG. 8 is a diagram illustrating the enable signals and other signals.

FIG. 8 is a diagram illustrating the waveforms of the enable signals Enb1 to Enb4 thus assigned over the periods a, b, c, and d. The first to seventh periods are generally expressed as the $m^{th}$ period, where m is an integer from 1 to 7.

The periods a, b, c, and d each correspond to one cycle of the clock signal Cly. The period of one cycle is divided into the first half (a high-level period) from the rising to the falling of the clock signal Cly and the latter half (a low-level period) from the falling to the rising of the clock signal Cly.

Thus, the first half of the period a is expressed as a1, and the latter half is expressed as a2, for the sake of convenience. Similarly, the first half of the period b is expressed as b1, and the latter half is expressed as b2; the first half of the period c is expressed as c1, and the latter half is expressed as c2; and the first half of the period d is expressed as d1, and the latter half is expressed as d2.

The operation of the electrooptic device will next be described.

The scan control circuit 52 makes the display-data processing circuit 56 store the display data Video sent from the external higher level device in the internal memory, then reads it at twice the memory speed in synchronism with the driving of the display panel 10, and converts it to an analog data signal, Vid.

This operation proceeds for the period of one frame, from the first period to the seventh period, in each of which it proceeds in the order of periods a, b, c, and d.

Figure 9:
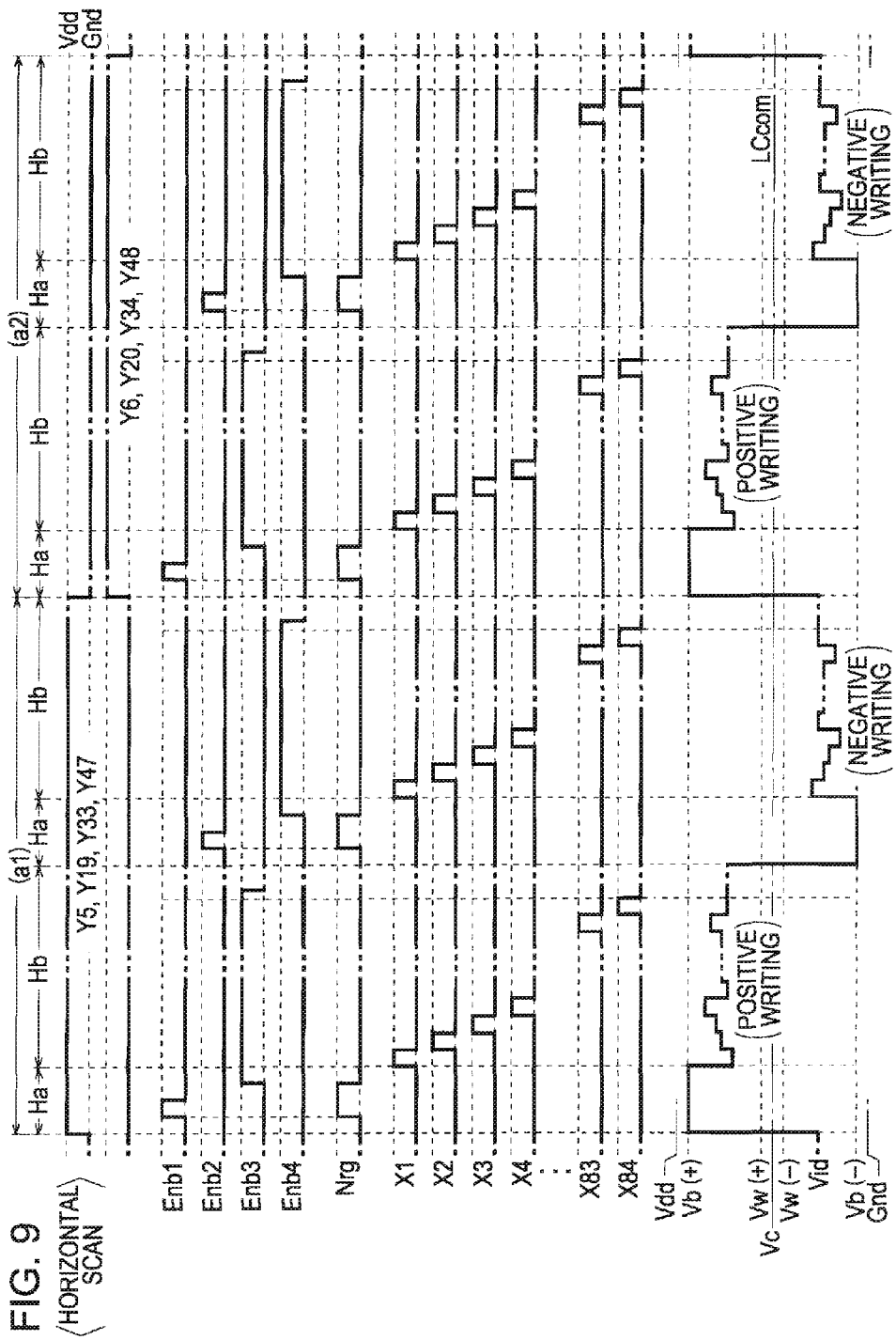

As shown in FIG. 9, during the first half period a1 of the period a in the first period, among the output signals from the Y-shift register 132, signals Y5, Y19, Y33, and Y47 rise to high level, and signals Pb1, Pb2, Vw1, and Vw2 are assigned as the enable signals Enb1 to Enb4 during the period a, respectively. Therefore, the enable signal Enb1 rises to high level first in the first half period a1. However, it is only the $33^{rd}$ row of the $5^{th}$, $19^{th}$, $33^{rd}$, and $47^{th}$ rows that the scanning-line driving circuit 130 inputs the enable signal Enb1. Accordingly, when the enable signal Enb1 rises to high level during the first half period a1, only the scanning signal G33 rises to high level.

During a horizontal effective period, if positive writing is designated, the display-data processing circuit 56 converts the display data Video to the data signal Vid of a voltage higher than the voltage LCcom by the amount corresponding to the gray level of the pixel in the range from the voltage Vb(+) corresponding to black to the voltage Vw(+) corresponding to white, and if negative writing is designated, the display-data processing circuit 56 converts the display data Video to the data signal Vid of a voltage lower than the voltage LCcom by the amount corresponding to the gray level of the pixel in the range from the voltage Vb(−) corresponding to black to the voltage Vw(−) corresponding to white.

On the other hand, during the horizontal flyback period, if positive writing is designated, the display-data processing circuit 56 applies a voltage Vb(+) corresponding to black as the data signal Vid, and if negative writing is designated, the display-data processing circuit 56 applies a voltage Vb(−) corresponding to black as the data signal Vid.

In this embodiment, the period to which positive writing is designated is the first half of the equally divided period of the half cycle of the clock signal Cly, and the period to which negative writing is designated is the latter half of the equally divided period of the half cycle of the clock signal Cly.

Figure 10:
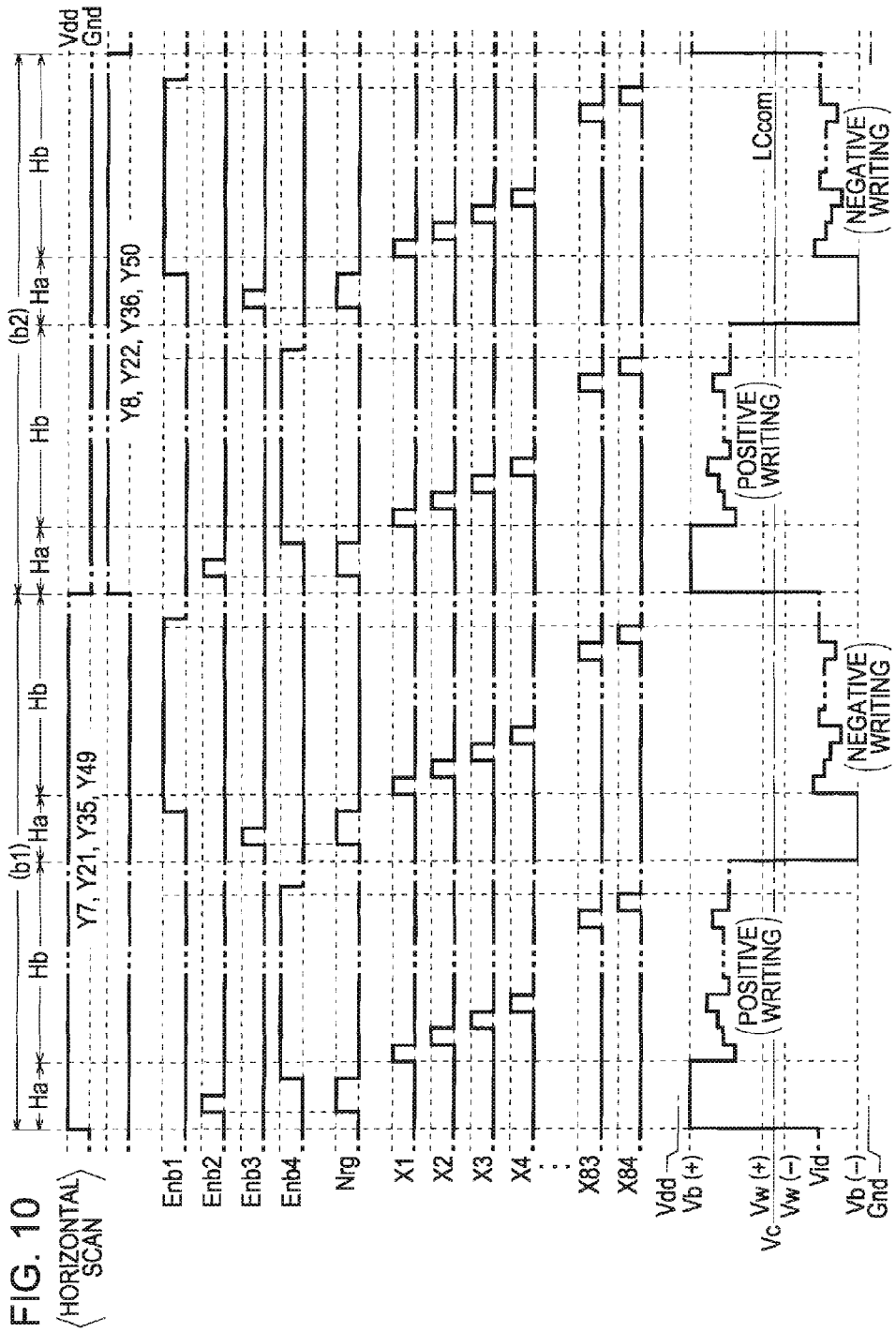
FIG. 10 is a diagram illustrating a voltage writing operation during period b.
Figure 11:
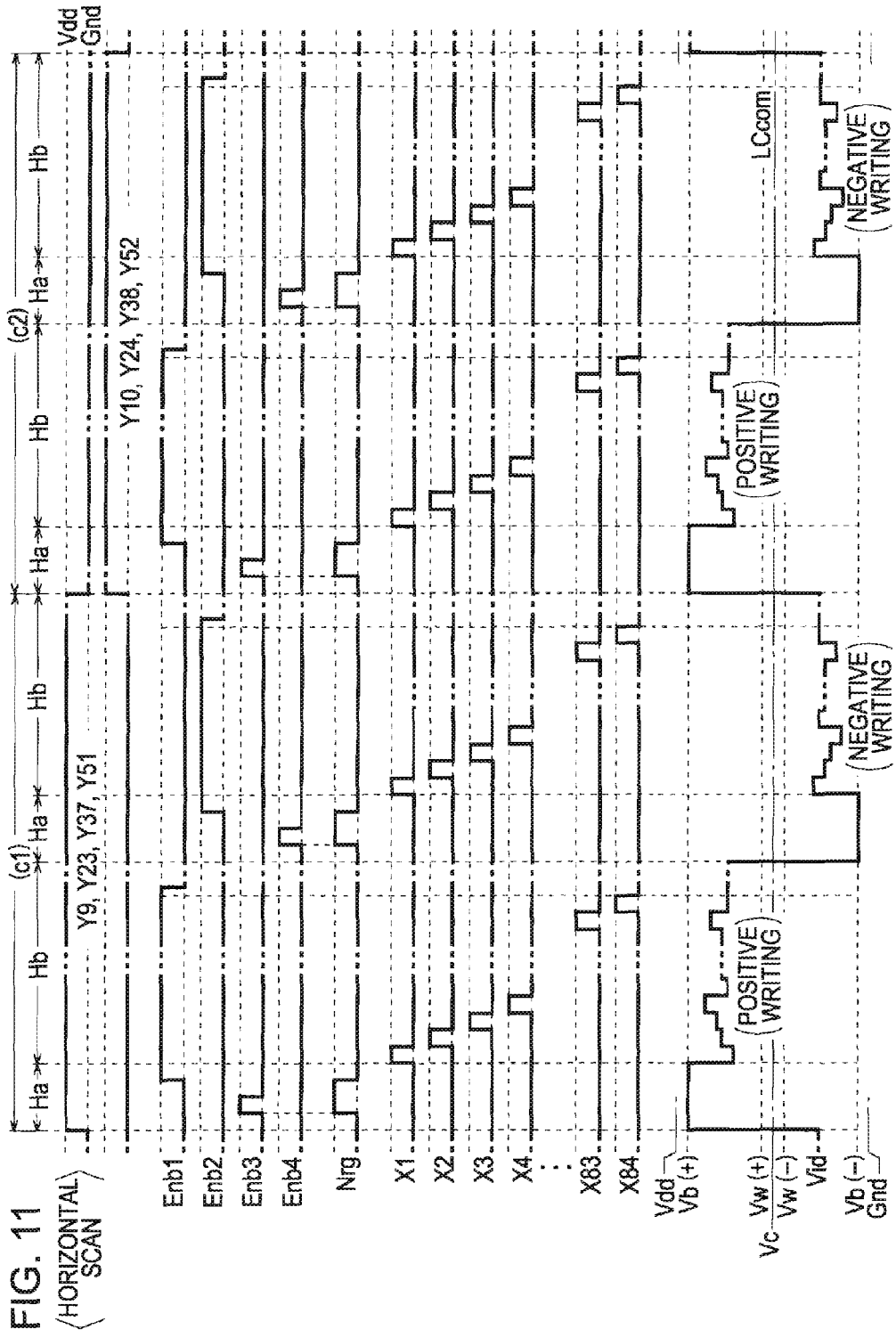
FIG. 11 is a diagram illustrating a voltage writing operation during period c.
Figure 12:
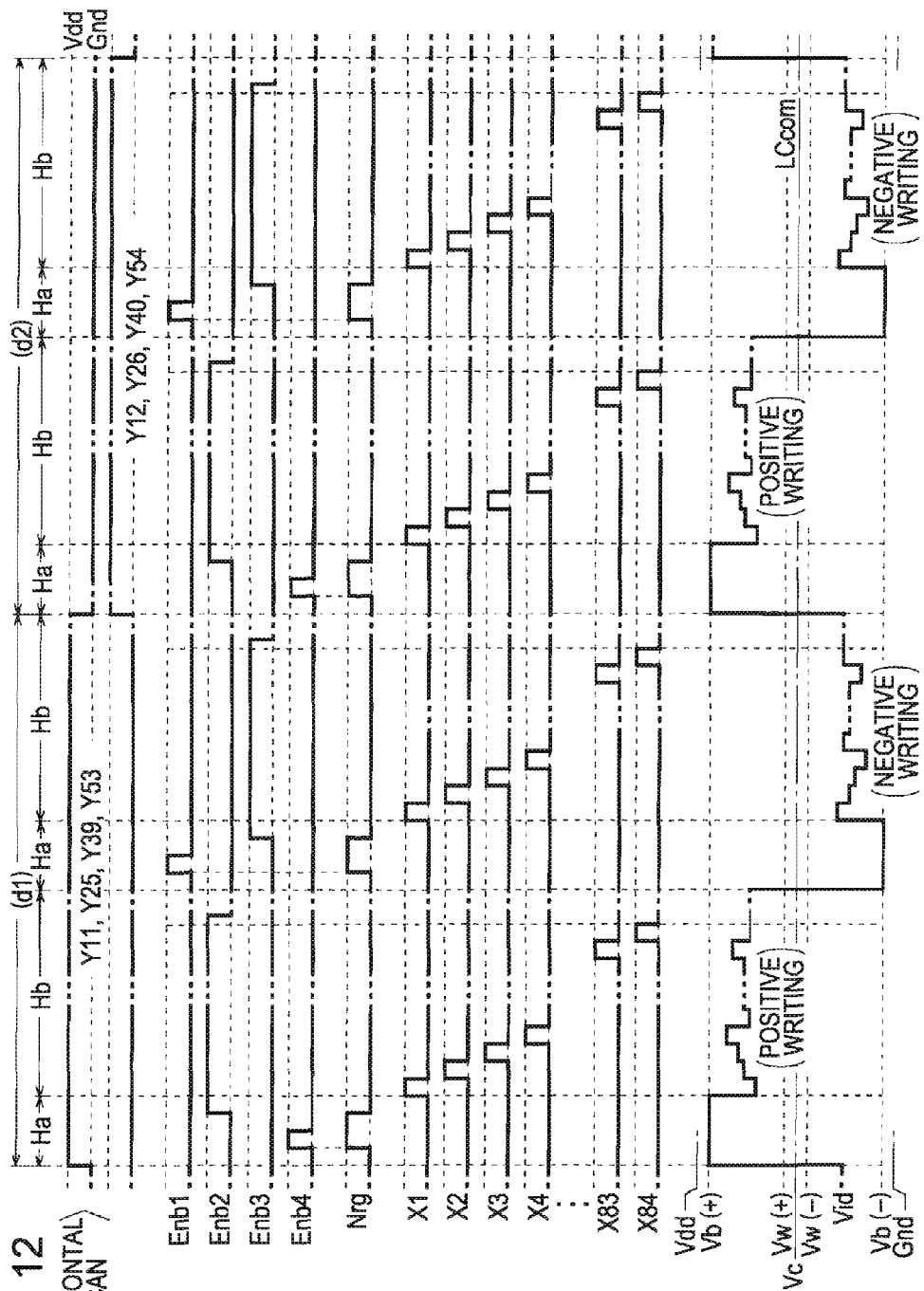
FIG. 12 is a diagram illustrating a voltage writing operation during period d.

The horizontal effective period means the period during which the signals X1 to X84 are output from the X-shift register 142 in the first and latter halves of the equally divided period of the half cycle of the clock signal Cly, which is indicated by Hb in FIG. 9 (FIGS. 10 to 12). The horizontal flyback period means a period in which the horizontal effective period Hb is excluded from each of the first and latter halves of the equally divided period of the half cycle of the clock signal Cly, which is indicated by Ha in FIG. 9 (FIGS. 10 to 12).

In this embodiment, a voltage higher than the voltage LCcom applied to the common electrode 108 is referred to as a positive voltage, and a voltage lower than the voltage LCcom is referred to as a negative voltage. Here, a voltage Vc shifted from the voltage LCcom may be used as the reference, as will be described later. The vertical scale of the data signal Vid in FIG. 9 (FIGS. 10 to 12) is magnified from the voltage waveform of the other logic signals.

During the period in which the enable signal Enb1 (Pb1) is at high level in the first half period a1 of the first period, the display-data processing circuit 56 outputs a positive voltage Vb(+) that makes the pixels black to the image signal line 171 as a data signal Vid, and the control-signal generating circuit 54 shifts the signal Nrg to high level.

When the signal Nrg rises to high level, all the signals output from the OR circuits 146 in the first to $84^{th}$ columns rise to high level irrespective of the signals output from the X-shift register 142. Thus, all the TFTs 148 are turned on and as such, the data signal Vid applied to the image signal line 171 are sampled, and the data lines 114 in the first to $84^{th}$ columns are precharged at the positive voltage Vb(+) of the data signal Vid.

When the scanning signal G33 is shifted to high level by the enable signal Enb1, all the TFTs 116 of the pixels 110 in the $33^{rd}$ row are turned on. Thus, the voltage Vb(+) of the data signal Vid sampled to the data lines 114 is applied to the pixel electrodes 118. Thus, a positive voltage corresponding to black is written to the liquid crystal capacitors 120 of the pixels in the first to $84^{th}$ columns of the $33^{rd}$ row, so that the pixels in the $33^{rd}$ row become black.

When the enable signal Enb1 falls to low level, the TFTs 116 of the pixels 110 in the $33^{rd}$ row are turned off, but maintained in black because the written voltage is held owing to the voltage holding performance of the liquid crystal capacitors 120 and the storage capacitors 109.

Thus, all the data lines 114 are precharged at the positive voltage V(+) and the pixels in the $33^{rd}$ row are made black by the enable signal Enb1.

During the first half period a1, the enable signal Enb1 and the signal Nrg then fall to low level and the enable signal Enb3 rises to high level.

During the period in which the enable signal Enb3 (Vw1) is at high level, the scan control circuit 52 controls the display-data processing circuit 56 so as to read the display data Video corresponding to the fifth row stored in the memory at double speed, to convert it to a positive data signal Vid, and to apply it to the image signal line 171, and outputs a clock signal Clx and a start pulse Dx so that the signals X1 to X84 rise to high level in sequence in accordance with this application.

Specifically, the scan control circuit 52 controls the X-shift register 142 with the clock signal Clx and the start pulse Dx so that the signals X1 to X84 rise to high level in sequence at the timing when the data signal Vid corresponding to the pixels in the first to $84^{th}$ columns of the fifth row of is applied to the image signal line 171.

As described above, during the first half period a1 of the first period, the signals Y5, Y19, Y33, and Y47 from the Y-shift register 132 rise to high level; however, the enable signal Enb3 is input only to the fifth row of the fifth, $19^{th}$, $33^{rd}$, and $47^{th}$ rows. Accordingly, when the enable signal Enb3 rises to high level during the first half period a1, only the scanning signal G19 rises to high level.

When the signal X1 from the X-shift register 142 rises to high level in this state, the TFT 148 in the first column is turned on, and thus the data signal Vid applied to the image signal line 171 and corresponding to the pixel in the fifth row of the first column is sampled to the data line 114 in the first column. Similarly, when the signals X2 to X84 rise to high level in sequence, the TFTs 148 in the second to $84^{th}$ columns are turned on in sequence. Therefore, the data signals Vid corresponding to the pixels in the second to $84^{th}$ columns of the fifth row are sampled to the data lines 114 of the second to $84^{th}$ columns.

When the scanning signal G5 rises to high level, all the TFTs 116 of the pixels 110 in the fifth row are turned on. Thus, the voltage of the data signal Vid sampled to the data lines 114 is applied to the pixel electrodes 118. Accordingly, a positive voltage corresponding to the gray level designated by the display data Video is written and held in the liquid crystal capacitors 120 of the pixels in the first to $84^{th}$ columns of the fifth row.

Then, the enable signal Enb3 falls to low level, and the enable signal Enb2 (Pb2) and the signal Nrg rise to high level.

During the period in which the enable signal Enb2 (Pb2) is at high level, the display-data processing circuit 56 outputs a negative voltage Vb(−) that makes the pixel black to the image signal line 171 as a data signal Vid.

Since the signal Nrg is at high level, all the signals output from the OR circuits 146 of the first to 84$^{th}$ columns become high level. Therefore, all the TFTs 148 are turned on and as such, the data signal Vid applied to the image signal line 171 is sampled, and the data lines 114 in the first to 84$^{th}$ columns are precharged at the negative voltage Vb(−) of the data signal Vid.

During the first half period a1 of the first period, the signals Y5, Y19, Y33, and Y47 from the Y-shift register 132 rise to high level; however, the enable signal Enb2 is input only to the 19$^{th}$ row of the fifth, 19$^{th}$, 33$^{rd}$, and 47$^{th}$. Accordingly, when the enable signal Enb2 rises to high level during the first half period a1, only the scanning signal G19 rises to high level.

When the scanning signal G19 rises to high level, all the TFTs 116 of the pixels 110 in the 19$^{th}$ row are turned on. Thus, the voltage Vb(−) of the data signal Vid sampled to the data lines 114 is applied to the pixel electrodes 118. Accordingly, a negative voltage corresponding to black is written to the liquid crystal capacitors 120 of the pixels in the first to 84$^{th}$ columns of the 19$^{th}$ row, so that the pixels in the 19$^{th}$ row become black.

Thus, all the data lines 114 are precharged at the negative voltage Vb(−) and the pixels in the 19$^{th}$ row are made black by the enable signal Enb2.

During the first half period a1 of the first period, the enable signal Enb2 and the signal Nrg then fall to low level and the enable signal Enb4 rises to high level.

During the period in which the enable signal Enb4 (Vw2) is at high level, the scan control circuit 52 controls the display-data processing circuit 56 so as to read the display data Video corresponding to the 47$^{th}$ row stored in the memory at double speed, to convert it to a negative data signal Vid, and to apply it to the image signal line 171, and outputs a clock signal Clx and a start pulse Dx so that the signals X1 to X84 rise to high level in sequence in accordance with this application.

During the first half period a1, the signals Y5, Y19, Y33, and Y47 from the Y-shift register 132 rise to high level; however, the enable signal Enb4 is input only to the 47$^{th}$ row of the fifth, 19$^{th}$, 33$^{rd}$, and 47$^{th}$. Accordingly, when the enable signal Enb4 rises to high level during the first half period a1, only the scanning signal G47 rises to high level.

When the signal X1 from the X-shift register 142 rises to high level in this state, the TFT 148 in the first column is turned on, so that the data signal Vid corresponding to the pixel in the 47$^{th}$ row of the first column applied to the image signal line 171 is sampled to the data line 114 in the first column. Similarly, when the signals X2 to X84 rise to high level in sequence, the TFTs 148 in the second to 84$^{th}$ columns are turned on in sequence. Therefore, the data signals Vid corresponding to the pixels in the second to 84$^{th}$ columns of the 47$^{th}$ row are sampled to the data lines 114 of the second to 84$^{th}$ columns.

When the scanning signal G47 rises to high level, all the TFTs 116 of the pixels 110 in the 47$^{th}$ row are turned on. Thus, the voltage of the data signal Vid sampled to the data lines 114 is applied to the pixel electrodes 118. Accordingly, a negative voltage corresponding to the gray level designated by the display data Video is written and held in the liquid crystal capacitors 120 of the pixels in the first to 84$^{th}$ columns of the 47$^{th}$ row.

During the latter half period a2 of the period a in the first period, of the signals output from the Y-shift register 132, the signals Y6, Y20, Y34, and Y48 rise to high level. However, as in the first half period a1, the signals Pb1, Pb2, Vw1, and Vw2 are assigned in sequence as the enable signals Enb1 to Enb4. Therefore, the data lines 114 are precharged at the positive voltage Vb(−) by the enable signal Enb1 (Pb1), and the precharge voltage is written to the pixels in the 34$^{th}$ row to make them black; a positive voltage corresponding to the gray level is written to the pixels in the 6$^{th}$ row by the enable signal Enb3 (Vw1); the data lines 114 are precharged at a negative voltage Vb(−) by the enable signal Enb2 (Pb2), and the precharge voltage is written to the pixels in the 20$^{th}$ row to make them black; and a negative voltage corresponding to the gray level is written to the pixels in the 48$^{th}$ row by the enable signal Enb4 (Vw2).

Then, the operation shifts to the period b. During the period b, the signals Vw2, Pb1, Pb2 and Vw1 are assigned as the enable signals Enb1 to Enb4 in sequence (see FIG. 7). Accordingly, as shown in FIG. 8 or 10, during the first half period b1 and the latter half period b2, the enable signal Enb2 becomes a short pulse (signal Pb1) in time sequence for positive precharge, the enable signal Enb3 becomes a long pulse signal Vw1) for positive writing, the enable signal Enb4 becomes a short pulse (signal Pb2) for negative precharge, and the enable signal Enb1 becomes a long pulse (signal Vw2) for negative writing.

During the first half period b1 of the first period, of the signals output from the Y-shift register 132, the signals Y7, Y21, Y35, and Y49 rise to high level, and during the latter half period b2, the signals Y8, Y22, Y36, and Y50 rise to high level.

During the first and latter half periods b1 and b2, the enable signal Enb2 output first is input to the 35$^{th}$ and 36$^{th}$ rows; the enable signal Enb4 output second is input to the seventh and eighth rows; the enable signal Enb3 output third is input to the 21$^{st}$ and 22$^{nd}$ rows; and the enable signal Enb1 output fourth is input to the 49$^{th}$ and 50$^{th}$ rows.

Therefore, during the first half period b1, the data lines 114 are precharged at the positive voltage Vb(+) by the enable signal Enb2 (Pb1), and the precharge voltage is written to the pixels in the 35$^{th}$ row to make them black; a positive voltage corresponding to the gray level is written to the pixels in the 21$^{st}$ row by the enable signal Enb4 (Vw1); the data lines 114 are precharged at a negative voltage Vb(−) by the enable signal Enb3 (Pb2), and the precharge voltage is written to the pixels in the 21$^{st}$ row to make them black; and a negative voltage corresponding to the gray level is written to the pixels in the 49$^{th}$ row by the enable signal Enb1 (Vw2).

During the latter half period b2, the data lines 114 are precharged at the positive voltage Vb(+) by the enable signal Enb2 (Pb1), and the precharge voltage is written to the pixels in the 36$^{th}$ row to make them black; a positive voltage corresponding to the gray level is written to the pixels in the eighth row by the enable signal Enb4 (Vw1); the data lines 114 are precharged at a negative voltage Vb(−) by the enable signal Enb3 (Pb2), and the precharge voltage is written to the pixels in the 22$^{nd}$ row to make them black; and a negative voltage corresponding to the gray level is written to the pixels in the 50$^{th}$ row by the enable signal Enb1 (Vw2).

Then, the operation shifts to the period c of the first period. During the period c, the signals Vw1, Vw2, Pb1, and Pb2 are assigned as the enable signals Enb1 to Enb4 in sequence (see FIG. 7). Accordingly, as shown in FIG. 8 or 11, during the first half period c1 and the latter half period c2, the enable signal Enb3 becomes a short pulse (signal Pb1) in time sequence for positive precharge, the enable signal Enb1 becomes a long pulse (signal Vw1) for positive writing, the enable signal Enb1 becomes a short pulse (signal Pb2) for negative precharge, and the enable signal Enb2 becomes a long pulse (signal Vw2) for negative writing.

During the first half period c1 of the first period, of the signals output from the Y-shift register 132, the signals Y9, Y23, Y37, and Y51 rise to high level, and during the latter half period c2, the signals Y10, Y24, Y38, and Y52 rise to high level. During the first and latter half periods c1 and c2; the enable signal Enb3 output first is input to the $37^{th}$ and $38^{th}$ rows; the enable signal Enb1 output second is input to the ninth and tenth rows; the enable signal Enb4 output third is input to the $23^{rd}$ and $24^{th}$ rows; and the enable signal Enb2 output fourth is input to the $51^{st}$ and $52^{nd}$ rows.

Therefore, during the first half period c1 of the first period the data lines 114 are precharged at the positive voltage Vb(+) by the enable signal Enb3 (Pb1), and the precharge voltage is written to the pixels in the $37^{th}$ row to make them black; a positive voltage corresponding to the gray level is written to the pixels in the ninth row by the enable signal Enb1 (Vw1); the data lines 114 are precharged at a negative voltage Vb(−) by the enable signal Enb2 (Pb2), and the precharge voltage is written to the pixels in the $23^{rd}$ row to make them black; and a negative voltage corresponding to the gray level is written to the pixels in the $51^{sr}$ row by the enable signal Enb4 (Vw2).

During the latter half period c2 of the first period, the data lines 114 are precharged at the positive voltage Vb(+) by the enable signal Enb3 (Pb1); and the precharge voltage is written to the pixels in the $38^{th}$ row to make them black; a positive voltage corresponding to the gray level is written to the pixels in the tenth row by the enable signal Enb1 (Vw1); the data lines 114 are precharged at a negative voltage Vb(−) by the enable signal Enb2 (Pb2), and the precharge voltage is written to the pixels in the $24^{th}$ row to make them black; and a negative voltage corresponding to the gray level is written to the pixels in the $52^{nd}$ row by the enable signal Enb4 (Vw2).

Then, the operation shifts to the period d of the first period. During the period d, the signals Pb2, Vw1, Vw2, and Pb1 are assigned as the enable signals Enb1 to Enb4 in sequence (see FIG. 7). Accordingly, as shown in FIG. 8 or 12, during the first half period d1 and the latter half period d2, the enable signal Enb4 becomes a short pulse (signal Pb1) for positive precharge, the enable signal Enb1 becomes a long pulse (signal Vw1) for positive writing, the enable signal Enb2 becomes a short pulse (signal Pb2) for negative precharge, and the enable signal Enb3 becomes a long pulse (signal Vw2) for negative writing, in time sequence.

During the first half period d1 of the first period, of the signals output from the Y-shift register 132, the signals Y11, Y25, Y39, and Y53 rise to high level, and during the latter half period d2, the signals Y12, Y26, Y40, and Y54, rise to high level. During the first and latter half periods d1 and d2, the enable signal Enb4 output first is input to the $39^{th}$ and $40^{th}$ rows; the enable signal Enb2 output second is input to the $11^{th}$ and $12^{th}$ rows; the enable signal Enb1 output third is input to the $25^{th}$ and $26^{th}$ rows; and the enable signal Enb3 output fourth is input to the $53^{rd}$ and $54^{th}$ rows.

Therefore, during the first half period d1 of the first period, the data lines 114 are precharged at the positive voltage Vb(+) by the enable signal Enb4 (Pb1), and the precharge voltage is written to the pixels in the $39^{th}$ row to make them black; a positive voltage corresponding to the gray level is written to the pixels in the $11^{th}$ row by the enable signal Enb2 (Vw1); the data lines 114 are precharged at a negative voltage Vb(−) by the enable signal Enb1 (Pb2) and the precharge voltage is written to the pixels in the $25^{th}$ row to make them black; and a negative voltage corresponding to the gray level is written to the pixels in the $53^{rd}$ row by the enable signal Enb3 (Vw2).

During the latter half period d2 of the first period, the data lines 114 are precharged at the positive voltage Vb(+) by the enable signal Enb4 (Pb1), and the precharge voltage is written to the pixels in the $40^{th}$ row to make them black; a positive voltage corresponding to the gray level is written to the pixels in the $12^{th}$ row by the enable signal Enb2 (Vw1); the data lines 114 are precharged at a negative voltage Vb(−) by the enable signal Enb1 (Pb2), and the precharge voltage is written to the pixels in the $26^{th}$ row to make them black; and a negative voltage corresponding to the gray level is written to the pixels in the $54^{th}$ row by the enable signal Enb3 (Vw2).

Figure 13:
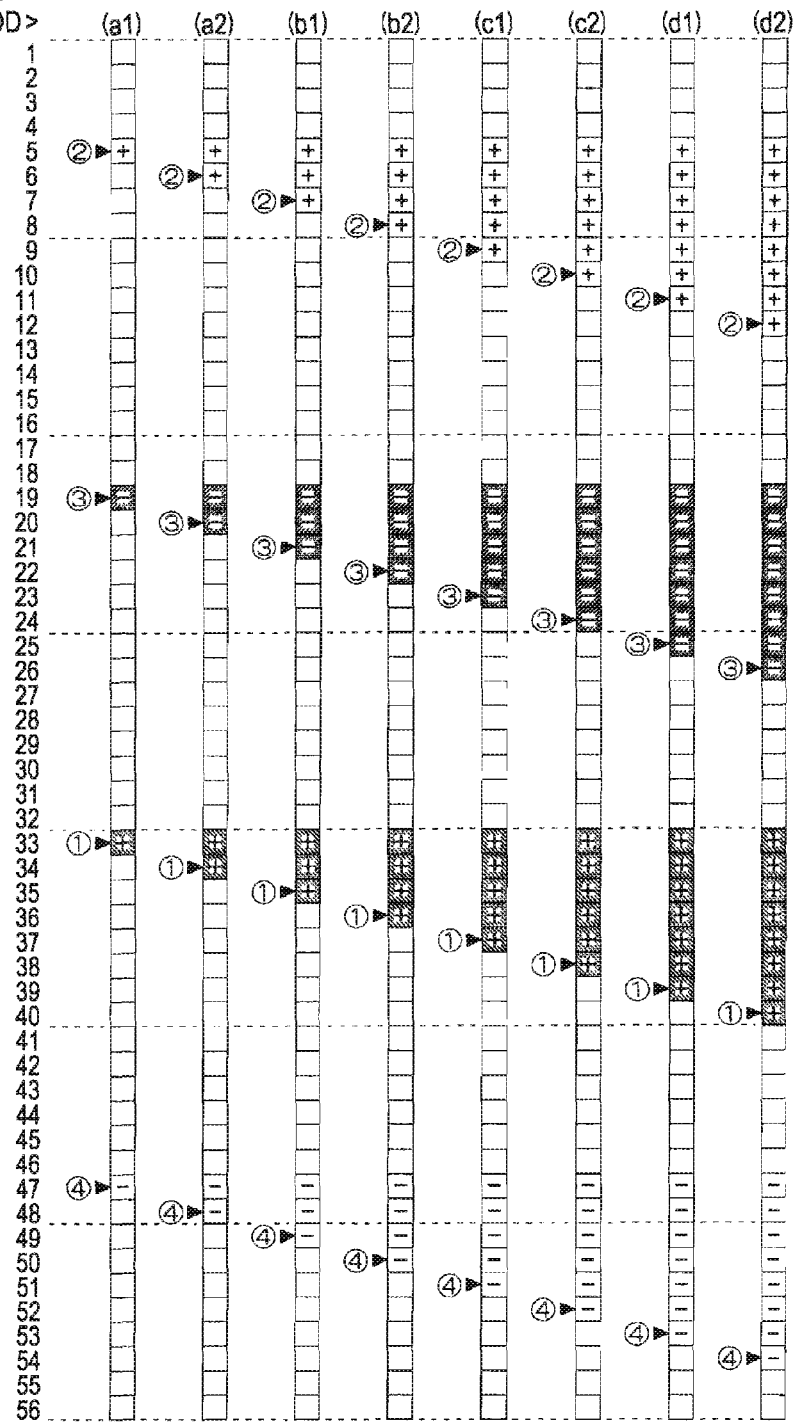
FIG. 13 is a diagram illustrating the state of voltage writing to the pixels during the first period.
Figure 14:
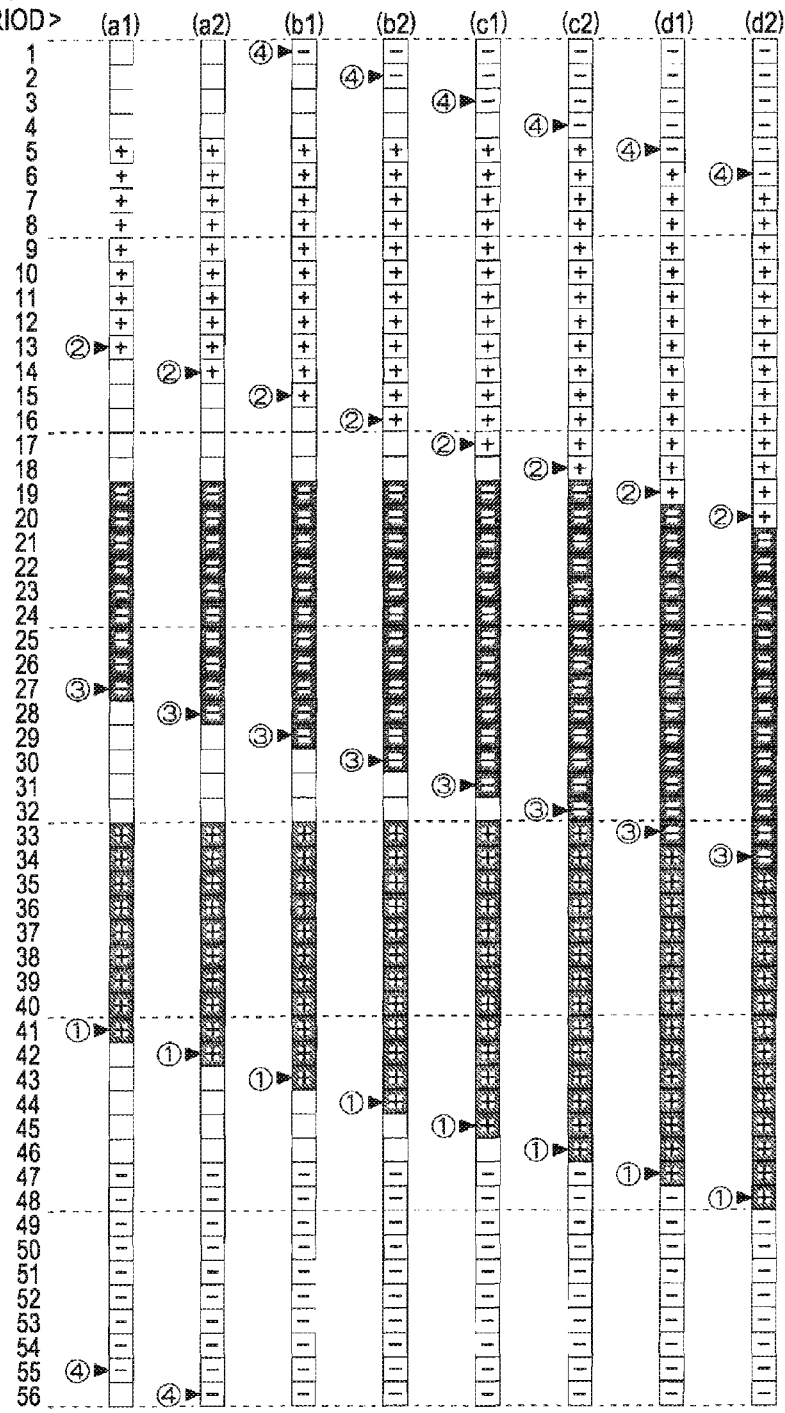
FIG. 14 is a diagram illustrating the state of voltage writing to the pixels during the second period.
Figure 15:
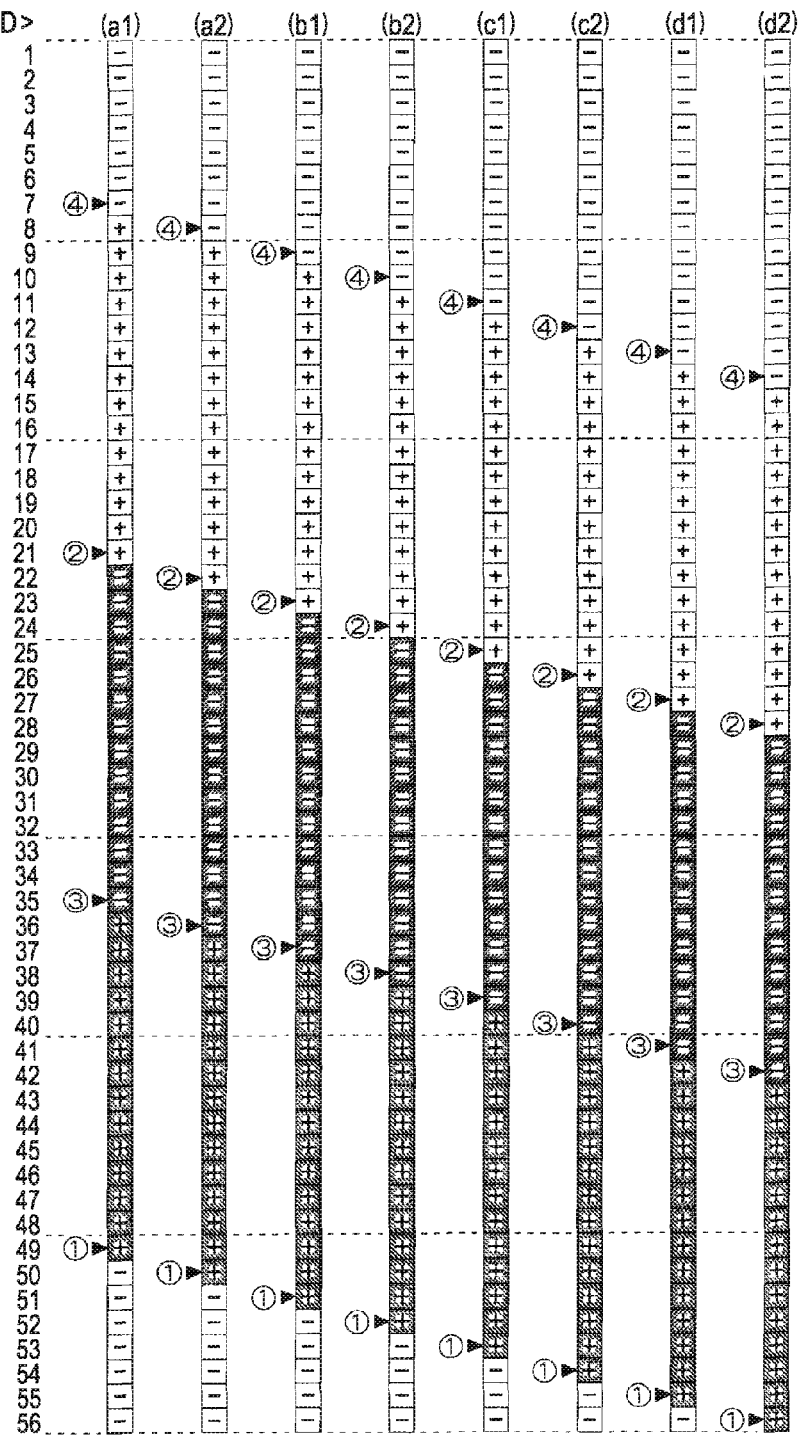
FIG. 15 is a diagram illustrating the state of voltage writing to the pixels during the third period.
Figure 16:
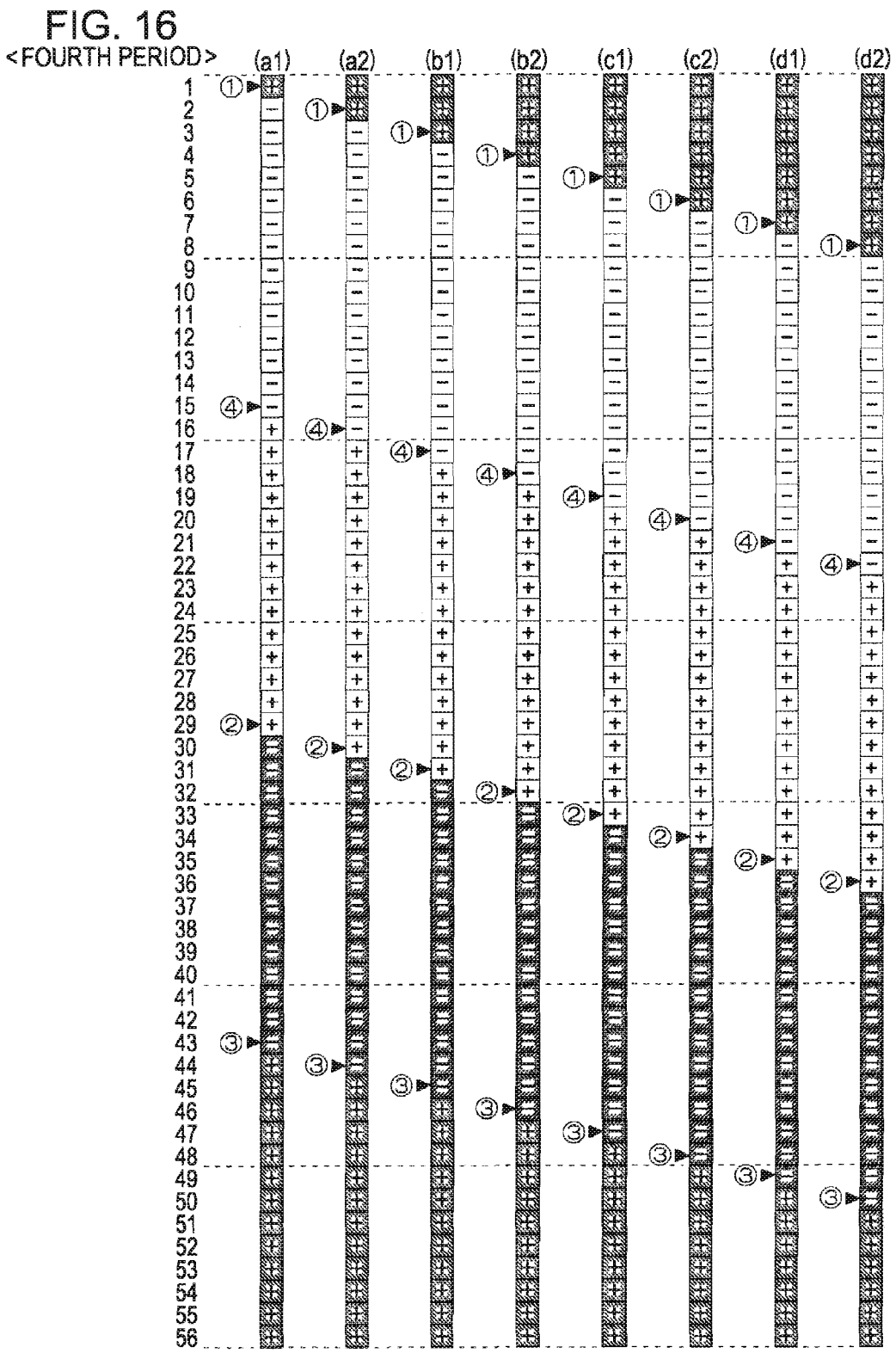
FIG. 16 is a diagram illustrating the state of voltage writing to the pixels during the fourth period.
Figure 17:
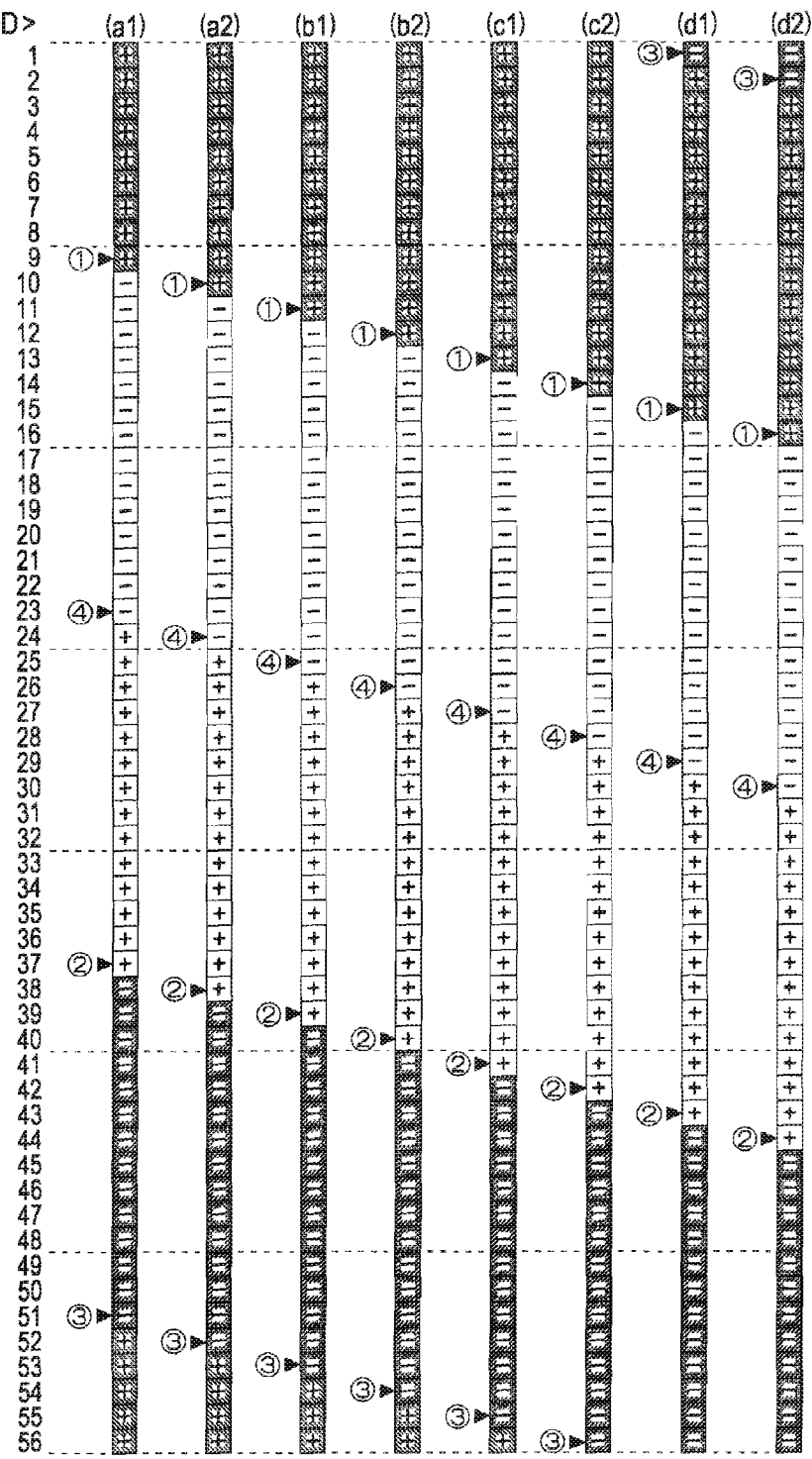
FIG. 17 is a diagram illustrating the state of voltage writing to pixels during the fifth period.
Figure 18:
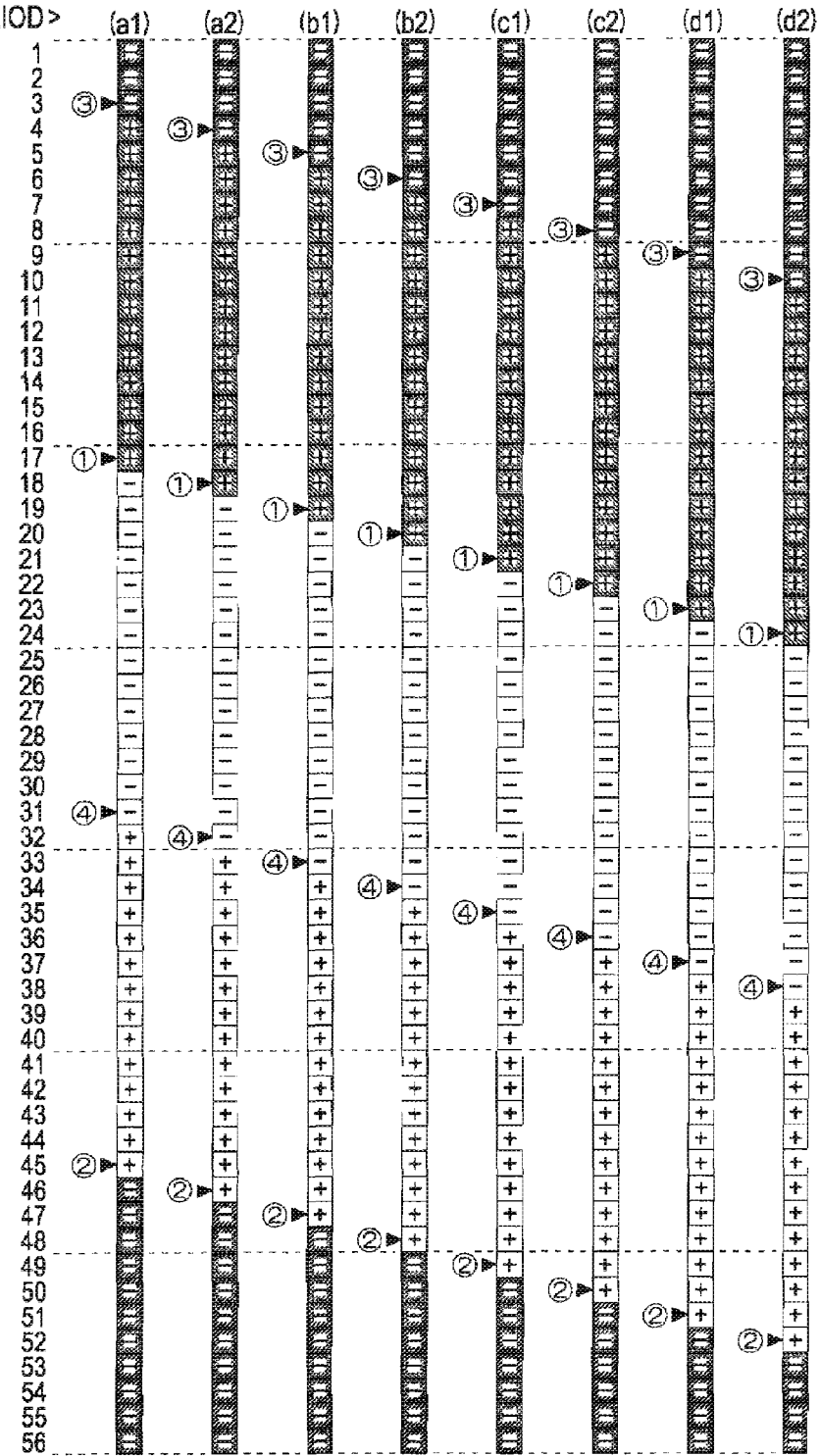
FIG. 18 is a diagram illustrating the state of voltage writing to the pixels during the sixth period.
Figure 19:
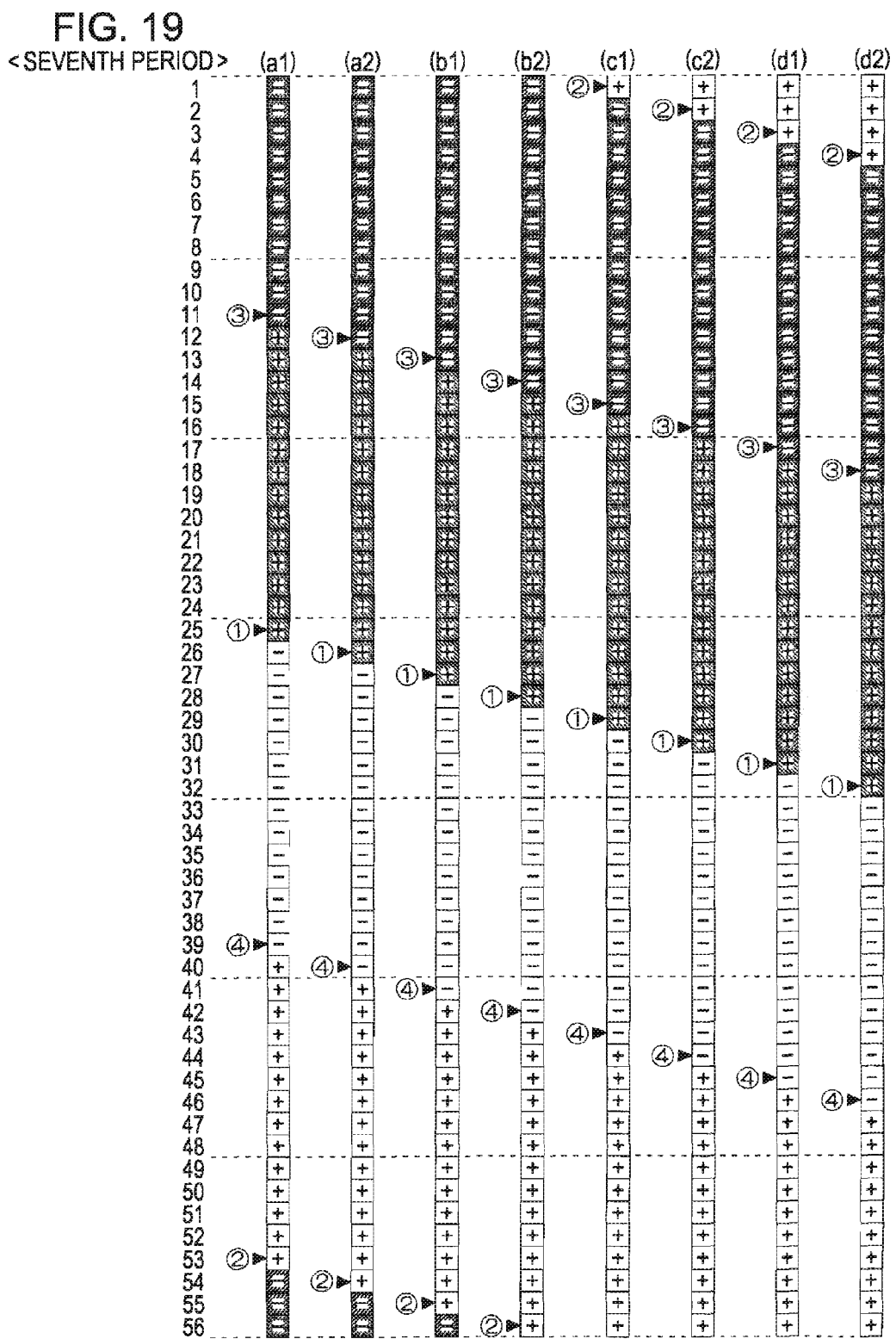
FIG. 19 is a diagram illustrating the state of voltage writing to the pixels during the seventh period.

Thus, as shown in FIG. 13, during the first period, by writing a positive precharge voltage corresponding to black to the pixels in the $33^{rd}$ to $40^{th}$ rows, the pixels become black (hatched square portions indicated by sign +); by writing a positive voltage corresponding to the gray level to the pixels in the fifth to $12^{th}$ rows, the pixels produce a gray level according to the display data Video (square portions indicated by sign +); by writing a negative precharge voltage corresponding to black to the pixels in the $19^{th}$ to $26^{th}$ rows, the pixels become black (hatched square portions indicated by sign −); and by writing a negative voltage corresponding to the gray level to the pixels in the $47^{th}$ to $54^{th}$ rows, the pixels produce a gray level according to the display data Video (square portions indicated by sign −).

In FIG. 13, numeral 1 in a circle indicates a row to which positive voltage corresponding to black is written by the enable signal to which the signal Pb1 is assigned; numeral 2 in a circle indicates a row to which positive voltage corresponding to the gray level is written by the enable signal to which the signal. Vw1 is assigned; numeral 3 in a circle indicates a row to which negative voltage corresponding to black is written by the enable signal to which the signal Pb2 is assigned; and numeral 4 in a circle indicates a row to which negative voltage corresponding to the gray level is written by the enable signal to which the signal Vw2 is assigned.

Also for the second to seventh periods, the similar operation is executed except the output of the Y-shift register 132 as shown in FIG. 5. The writing operations during the second to seventh periods are shown in FIGS. 14 to 19, respectively.

In this embodiment, as shown in the drawings, the number of the rows of the pixels 1 to which positive precharge voltage corresponding to black is written and held, the number of the rows of the pixels 2 to which positive voltage corresponding to the gray level is written and held, the number of the rows of the pixels 3 to which negative precharge voltage corresponding to black is written and held, and the number of the rows of the pixels 4 to which negative voltage corresponding to the gray level is written and held are each 14.

Figure 20:
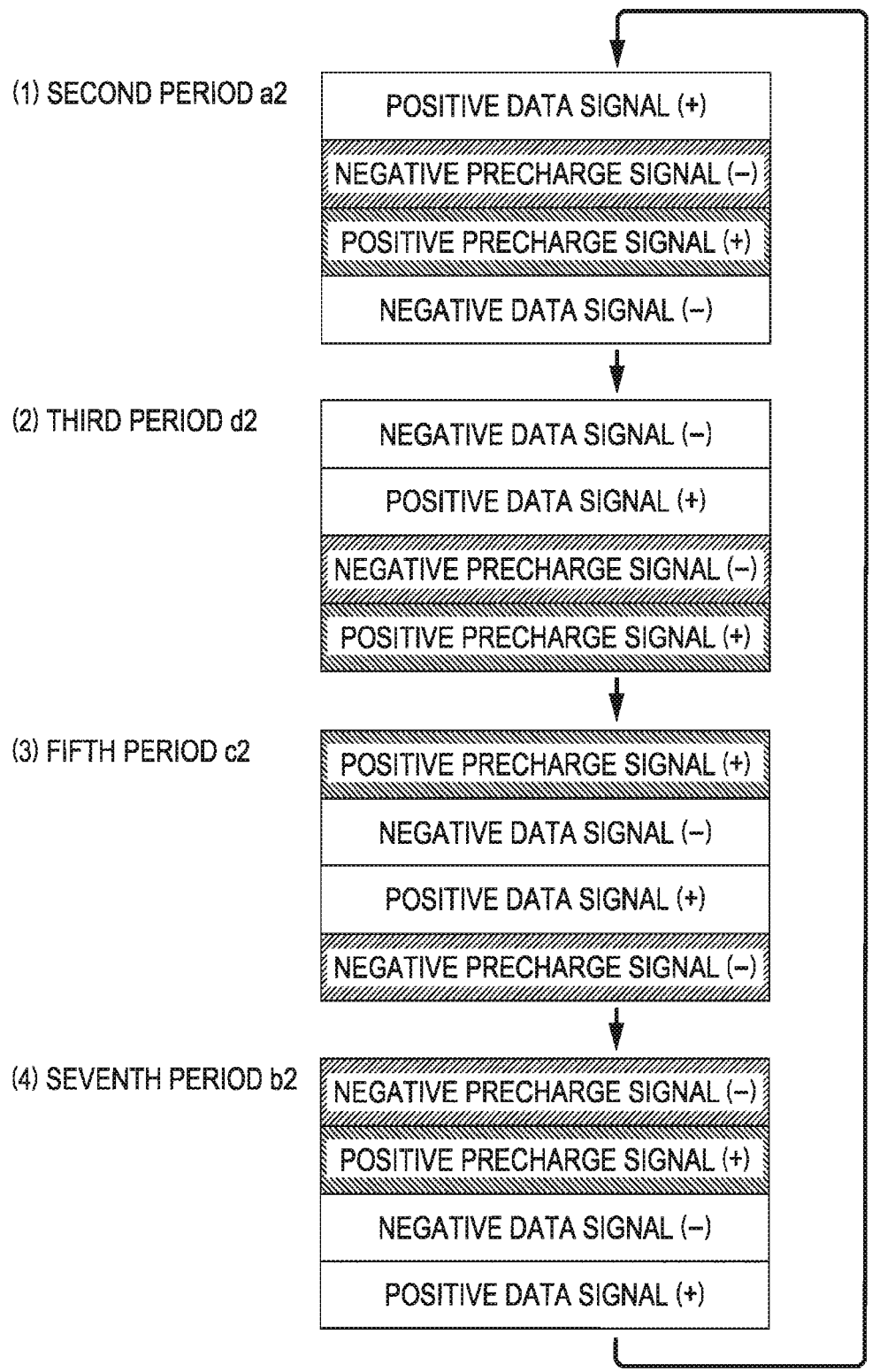
FIG. 20 is a diagram illustrating the state of the display area.

How the pixels in the display area 100 change during the period of one frame by such writing operation is shown in FIG. 20.

As shown in part 1 of FIG. 23, at the end of the latter half period a2 of period a in the second period, the display area 100 is divided into four in the Y direction in which the scanning lines are arranged as follows from the top: the area to which negative precharge voltage corresponding to the area to which gray level is written, the area to which positive precharge voltage corresponding to black is written, and the area to which positive precharge voltage corresponding to black is written, and the area to which negative voltage corresponding to the gray level is written. The areas divided into four parts change while scrolling downward in sequence as shown in part 1 to part 4 of FIG. 20.

In other words, a positive voltage corresponding to the gray level, a negative voltage corresponding to the gray level, a positive precharge voltage corresponding to black, and a negative precharge voltage corresponding to black are written to each pixel in that order (the starting point is not particularly specified) during the period of one frame.

According to the embodiment, the area to which a positive voltage and then a negative voltage corresponding to the gray level is written is then written a positive precharge voltage corresponding to black to become black, so that afterimages in displaying moving images are reduced. Furthermore, the area that has become black by a positive precharge voltage corresponding to black and the area that becomes black by a negative precharge voltage corresponding to black are adjacent to each other, thus increasing the width (length in the direction of column) of the black area.

Furthermore, in this embodiment, before a positive or negative voltage corresponding to the gray level is written, all the data lines 114 are precharged at a voltage of the same polarity corresponding to black, and the precharge voltage is written to the pixels to make them black. That is, the precharge and the operation to make the pixels black for reducing afterimages are executed at the same time. This saves the time to write a voltage corresponding to the gray level for making the pixels black.

In making the pixels black to reduce afterimages, the rows to which a negative precharge voltage and a positive precharge voltage are written are equal in number, and the rows to which a voltage corresponding to the gray level are equal between positive writing and negative writing. Therefore, the proportion of the positive polarity and the negative polarity of the voltage sampled to the data lines 114 is one to one in, for example, one frame.

Accordingly, for pixels in a given column, the proportion of the period in which a positive voltage is sampled to the data line 114 of the given column and the period in which a negative voltage is sampled across the holding period (non-selection period) in which no selecting voltage is applied to the scanning lines is one to one. Therefore, the voltage does not lean to one polarity depending on the row. Thus, the effects of the off leakage of the TFTs 116 are substantially the same between the upper part and the lower part of the display area 100, with no difference in display.

In this embodiment, the number of the rows of the scanning lines 112 is set at 56 for the convenience of description; it may be a multiple of eight rows that are the cycle at which the enable signal Enb1 to Enb4 are input to the AND circuits 136. In this embodiment, the numbers of the rows of the pixels 1 to which positive precharge voltage corresponding to black is written and held, the pixels 2 to which positive voltage corresponding to the gray level is written and held, the pixels 3 to which negative precharge voltage corresponding to black is written and held, and the pixels 4 to which negative voltage corresponding to the gray level is written and held are the same, 14. However, the numbers of the rows of all the pixels 1 to 4 may not necessarily be the same, provided that the numbers of the rows of the pixels 1 and 3 are the same, and the numbers of the rows of the pixels 2 and 4 are the same. It is preferable that the number of the rows of the pixels 1 and 3 to be black be about 30 to 50 percent of all the rows.

In this embodiment, as shown in FIG. 6, after the signal Pb1 falls from high level to low level, the signal Vw1 rises from low level to high level, and after the signal Pb2 falls from high level to low level, the signal Vw2 rises from low level to high level. Alternatively, it is possible that after the signal Pb1 rises to high level, the signal Vw1 rises to high level, and after the signal Pb2 rises to high level, the signal Vw2 rises to high level, under the condition that the signal Pb1 (Pb2) falls to low level before the output of the signal X1.

Thus, the pixels before a voltage corresponding to the gray level is written are at a voltage of the same polarity corresponding to black. This reduces the time for voltage writing or allows sufficient voltage writing as compared with writing of a voltage corresponding to the gray level from the state in which a voltage of the opposite polarity corresponding to black is held.

Specifically, in this embodiment, the pixels immediately before a positive voltage corresponding to the gray level is written hold a negative voltage Vb(−) corresponding to black, while the pixels immediately before a negative voltage corresponding to the gray level is written hold a positive voltage corresponding to the gray level. However, it may take much time to write a voltage of an opposite polarity (corresponding to the gray level) from the previous state or it may be prevent writing the voltage sufficiently because of a great difference in voltage. Therefore, a configuration in which the signal vw1 rises to nigh level when the signal Pb1 rises to high level, and the signal vw2 rises to high level when the signal Pb2 rises to high level brings the voltage stored in the pixels to a voltage corresponding to black of the same polarity as the voltage to be written, reducing the difference in voltage. This reduces the time to write a voltage corresponding to the gray level or allows writing of the voltage sufficiently.

The scanning-line driving circuit 130 is configured such that the scanning signals G1 to G56 are active at high level, and nonactive in low level. This is because the TFTs 116 that switch in response to scanning signals is of N channel type. Therefore, if the TFTs 116 are of P channel type, the scanning-line driving circuit 130 may be configured such that the scanning signals G1 to G56 is active in low level and is nonactive at high level.

In the above description, the voltage LCcom applied to the common electrode 108 is used as the reference of polarity writing. This applies to the case where the TFTs 116 of the pixels 110 work as ideal switches. Actually, a phenomenon (called pushdown, punch through, or field through) occurs in which the potential of the drain (pixel electrode 118) decreases w the TFT 116 is switched from ON to OFF owing to the parasitic capacitance between the gate and the drain. To prevent degradation of liquid crystal, the liquid crystal capacitor 120 must be driven with alternating current. However, if the liquid crystal capacitor 120 is driven with alternating current with the voltage LCcom applied to the common electrode 108 as the reference of polarity writing, the effective voltage of the liquid crystal capacitor 120 by negative writing becomes a little higher than that by positive writing because of pushdown (when the TFTs 116 are of N channel type). Therefore, the reference voltage for polarity writing and the voltage LCcom of the common electrode 108 are set different. Specifically, the reference voltage for polarity writing may be set higher than the voltage LCcom so that the influence of pushdown is offset.

The above embodiment employs a so-called dot sequential system in which a voltage corresponding to the gray level is written to the pixels of one scanning line 112 by sampling the data signals Vid to the first to $84^{th}$ columns in sequence. Alternatively, a so-called phase expansion (also called serial-parallel conversion) driving may be used together in which data signals are expended to n times (n is an integer equal to or greater than 2) along time axis, and applied to n image signal lines (refer to JP-A-2000-112437). As another alternative, a so-called line sequential system may be employed in which data signals are applied to all the data lines 114 collectively.

Furthermore, although the embodiment employs a normally white mode in which white display is obtained when no voltage is applied, a normally black mode may be employed. Three pixels corresponding to red (R), green (G) and blue (B) may constitute one dot for color display. The display area 100 may not necessarily be of the transmissive type but may be either of a reflecting type or of a transflective type that is intermediate therebetween.

Figure 21:
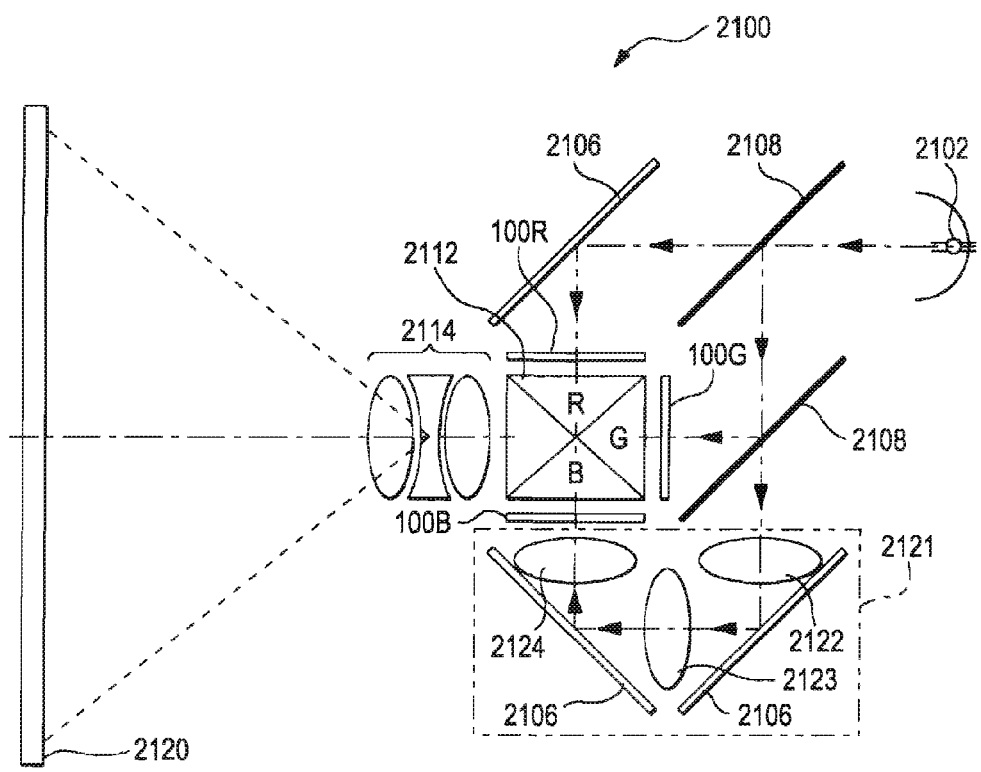
FIG. 21 is a plan view of a protector that uses the electrooptic device according to an embodiment of the invention.

An example of an electronic device incorporating the electrooptic device according to the above-described embodiment will be described. FIG. 21 is a plan view of a 3-LCD projector that uses the electrooptic device 1 as a light valve.

The projector 2100 separates the light to the light valve into three primary colors of RGB by three mirrors 2106 and two dichroic mirrors 2108 disposed inside, and introduces the lights to corresponding light valves 100R, 100G, and 100B. Since the blue light is longer in optical length than the other red and green lights, it is introduced through a relay lens system 2121, including an input lens 2122, a relay lens 2123, and an output lens 2124.

The light valves 100R, 100G, and 100B have the same configuration as that of the display area 100 of the electrooptic device 1 according to the foregoing embodiment, which are driven according to image data corresponding to R, G, and B provided from an external higher level system (not shown), respectively.

The lights modulated by the light valves 100R, 100G, and 100B enter a dichroic prism 2112 from three directions. The dichroic prism 2112 refracts the red and blue lights at 90° and let the green light travel in a straight line. Thus, the images of three colors are combined and projected forwardly in an enlarged scale by a lens unit 2114 and as such, a color image is displayed on a screen 2120.

The images through the light valves 100R and 100B are projected after reflected by the dichroic prism 2112, while the image through the light valve 100G is projected as it is. Thus, the horizontal scanning direction of the light valves 100R and 100B is reversed from that of the light valve 100G so as to display a laterally reversed image.

Examples of the electronic device include monitor-direct-view type devices such as portable phones, portable computers, televisions, monitors of video cameras, car navigation systems, pagers, electronic notebooks, calculators, word processors, workstations, TV phones, POS terminals, digital still cameras, and other devices having a touch panel, in addition to that described in FIG. 21. It is obvious that such electronic devices can incorporate the electrooptic device according to embodiments of the invention.

The entire disclosure of Japanese Patent Application No. 2006-268558, filed Sep. 29, 2006 is expressly incorporated by reference herein.

What is claimed is:

1. A method for driving an electrooptic device having pixels disposed in correspondence with the intersections of a plurality of rows of scanning lines and a plurality of data lines, each pixel producing a gray level corresponding to a data signal applied to a corresponding data line when a selecting voltage is applied to a corresponding scanning line, and a scanning-line driving circuit including a shift register and a logic circuit corresponding to each output stage of the shift register, the method comprising:

assigning four rows of the scanning lines that are separated from each other by a predetermined number of rows of the scanning lines, to a first precharge period, a first writing period, a second precharge period, and a second writing period, respectively;

sequentially assigning rows in subsequent sets of four rows to the first precharge period, the first writing period, the second precharge period, and the second writing period, respectively, the rows in each subsequent set of four rows being shifted one row each from rows of a preceding set of four rows, the rows assigned to a same one of the first precharge period, the first writing period, the second precharge period, and the second writing period forming a row group;

during the first precharge period, applying the selecting voltage to an assigned scanning line and providing a first data signal to the data lines, the first precharge data signal having a precharge voltage that makes the pixel black and having a polarity that is one of higher and lower than a predetermined reference voltage;

during the first writing period, applying the selecting voltage to an assigned scanning line and providing a first writing data signal to the data lines, the first writing data signal having a voltage corresponding to the gray level of the pixel and having a polarity that is one of higher and lower than the predetermined reference voltage;

during the second precharge period, applying the selecting voltage to an assigned scanning line and providing a second precharge data signal to the data lines, the second precharge data signal having a precharge voltage that makes the pixel black and having a polarity that is the other of higher and lower than the predetermined reference voltage;

during the second writing period, applying the selecting voltage to an assigned scanning line and providing a second writing data signal to the data lines, the second writing data signal having a voltage corresponding to the gray level of the pixel and having a polarity that is the other of higher and lower than the predetermined reference voltage; and inputting into each logic circuit corresponding to eight adjacent rows of the scanning lines an output signal from the output stage of the shift register and one of first to fourth enable signals, wherein:

a first pair of adjacent logic circuits receive input from the first enable signal, a second pair of adjacent logic circuits receive input from the second enable signal, a third pair of adjacent logic circuits receive input from the third enable signal and a fourth pair of adjacent logic circuits receive input from the fourth enable signal;

the row group of the first precharge period is next to the row group of the second precharge period;

the first writing period and the second writing period have a longer duration than the first precharge period and the second precharge period, respectively;

during the first precharge period, the first precharge data signal is applied to the data lines simultaneously;

during the second precharge period, the second precharge data signal is applied to the data lines simultaneously;

the output signal from the shift register is simultaneously applied to each set of the four rows of the scanning lines separated by the predetermined number of rows; and the first to the fourth enable signals achieve a high level in a predetermined order when the output signal from the shift register is simultaneously applied to each set of the four rows of the scanning lines separated by the predetermined number of rows such that each scanning line of the four rows of the scanning lines is assigned to the first precharging period, the first writing period, the second precharging period and the second writing period, respectively.

2. The method for driving an electrooptic device according to claim 1, wherein:

the first writing period is started after the end of the first precharge period; and the second writing period is started after the end of the second precharge period.

3. The method for driving an electrooptic device according to claim 1, wherein:
the termination of the first precharge period and the beginning of the first writing period are overlapped; and
the termination of the second precharge period and the beginning of the second writing period are overlapped.

4. The electrooptic device according to claim 1, wherein the first enable signal, the second enable signal, the third enable signal and the fourth enable signal are different enable signals.

5. An electrooptic device comprising:
pixels disposed in correspondence with the intersections of a plurality of rows of scanning lines and a plurality of data lines, each pixel producing a gray level, corresponding to a data signal applied to the data lines when a predetermined selecting voltage is applied to a scanning line corresponding to the pixel itself;
a data-line driving circuit that writes a voltage corresponding to the gray level to pixels corresponding to two rows of the scanning lines in order of a first precharge period, a first writing period, a second precharge period, and a second writing period, wherein during the first and the second precharge periods, the data-line driving circuit applies a data signal that makes the pixels black, and during the first and the second writing periods, the data-line driving circuit applies a data signal corresponding to the gray level of the pixels corresponding to the scanning lines to which the predetermined selecting voltage is applied; and
a scanning-line driving circuit that applies the predetermined selecting voltage or a predetermined nonselecting voltage to the plurality of rows of the scanning lines, the scanning-line driving circuit including:
a shift register having output stages corresponding to the plurality of rows of the scanning lines and outputting active-level signals from output stages corresponding to four rows that are separated from each other by a predetermined number of rows; and
a logic circuit provided to each output stage of the shift register, for carrying out a logic operation on the output signal from the output stage corresponding to the logic circuit itself and one of the first to the fourth enable signals, and applying the predetermined selecting voltage or the predetermined nonselecting voltage to the scanning line that corresponds to the logic circuit on the basis of the logic operation, wherein
the logic circuits correspond to adjacent eight rows of scanning lines input the first, the second, the third, and the fourth enable signals to corresponding two row sets, each logic circuit corresponding to the eight adjacent rows of the scanning lines receives an output signal from the output stage of the shift register and one of the first to the fourth enable signals, a first pair of adjacent logic circuits receive input from the first enable signal, a second pair of adjacent logic circuits receive input from the second enable signal, a third pair of adjacent logic circuits receive input from the third enable signal and a fourth pair of adjacent logic circuits receive input from the fourth enable signal;
the first to the fourth enable signals go to active level in some predetermined order of the first precharge period, the first writing period, the second precharge period, and the second writing period, during a period in which the signals from the output stages corresponding to the four rows go to active level, the first to the fourth enable signals going to active level;
a row group of the first precharge period is next to a row group of the second precharge period;
the first writing period and the second writing period have a longer duration than the first precharge period and the second precharge period, respectively;
during the first precharge period, the first precharge data signal is applied to the plurality of data lines simultaneously;
during the second precharge period, the second precharge data signal is applied to the plurality of data lines simultaneously;
the output signal from the shift register is simultaneously applied to each set of the four rows of the scanning lines separated by the predetermined number of rows; and
the first to the fourth enable signals achieve a high level in a predetermined order when the output signal from the shift register is simultaneously applied to each set of the four rows of the scanning lines separated by the predetermined number of rows such that each scanning line of the four rows of the scanning lines is assigned to the first precharging period, the first writing period, the second precharging period and the second writing period, respectively.

6. The electrooptic device according to claim 5, wherein
the first writing period is started after the end of the first precharge period; and
the second writing period is started after the end of the second precharge period.

7. The electrooptic device according to claim 5, wherein
the first writing period is started before the end of the first precharge period; and
the second writing period is started before the end of the second precharge period.

8. An electronic device comprising the electrooptic device according to claim 5.

* * * * *